(12) United States Patent
Yedidia et al.

(10) Patent No.: US 10,572,807 B2
(45) Date of Patent: Feb. 25, 2020

(54) METHOD AND DEVICE FOR THREE-WEIGHT MESSAGE-PASSING OPTIMIZATION SCHEME USING SPLINES

(71) Applicant: Disney Enterprises, Inc., Burbank, CA (US)

(72) Inventors: Jonathan Yedidia, Burbank, CA (US); Nate Derbinsky, Burbank, CA (US); Jose Bento Ayres Pereira, Burbank, CA (US); Dan Schmidt, Burbank, CA (US); Charles Mathy, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 909 days.

(21) Appl. No.: 15/087,940

(22) Filed: Mar. 31, 2016

(65) Prior Publication Data

US 2016/0217380 A1 Jul. 28, 2016

Related U.S. Application Data

(63) Continuation-in-part of application No. 14/107,937, filed on Dec. 16, 2013, now Pat. No. 9,639,813.

(60) Provisional application No. 61/816,305, filed on Apr. 26, 2013.

(51) Int. Cl.
*G06N 5/04* (2006.01)

(52) U.S. Cl.
CPC ...................................... *G06N 5/04* (2013.01)

(58) Field of Classification Search
None
See application file for complete search history.

(56) References Cited

U.S. PATENT DOCUMENTS

| | | | |
|---|---|---|---|
| 8,879,811 B2 | 11/2014 | Liu et al. | |
| 9,639,813 B2 | 5/2017 | Yedidia et al. | |
| 2010/0256852 A1* | 10/2010 | Mudalige | G08G 1/163 |
| | | | 701/24 |

(Continued)

OTHER PUBLICATIONS

Alonso-Mora et al. "Reciprocal Collision Avoidance for Multiple Car-like Robots", IEEE ICRA, 2012, pp. 360-366.*

(Continued)

*Primary Examiner* — Li Wu Chang
(74) *Attorney, Agent, or Firm* — Fay Kaplun & Marcin, LLP

(57) ABSTRACT

A method and device determines an optimization solution for an optimization problem. The method includes receiving the optimization problem having cost functions and variables in which each of the cost functions has a predetermined relationship with select ones of the variables. The variables comprise a sub-solution of a spline indicative of a curved path along an estimated trajectory. The method includes generating a first message for each of the cost functions for each corresponding variable based upon the relationship and a second message for each of the variables for each corresponding cost function based upon the relationship. The method includes generating a disagreement variable for each corresponding pair of variables and cost functions measuring a disagreement value between the first and second beliefs. The method includes forming a consensus between the first and second messages until the optimization solution is determined.

20 Claims, 12 Drawing Sheets

(56) References Cited

U.S. PATENT DOCUMENTS

2015/0330209 A1* 11/2015 Panchal .................. E21B 7/04
                                                     700/275
2016/0217380 A1   7/2016 Yedidia et al.

OTHER PUBLICATIONS

Derbinsky et al., "An Improved Three-Weight Message-Passing Alogrithm," ArXiv:1305.1961(2013).

Bento et al., "A message-passing algorithm for multi-agent trajectory planning," Advances in Neural Information Processing Systems (NIPS) (2013).

Mathy et al., "Sparta:Fast global planning of collison-avoiding robot trajectories," NIPS Workshop on Learning, Inference, and Control of Multi-Agent Systems,(2015).

Boyd et al., ("Distributed Optimization and Statistical Learning via the Alternating Direction Method of Multipliers", FTML, vol. 3. No. 1(2010), pp. 1-122.

Martins et al., "An Augmented Lagrangian Approach to Constrained MAP Inference", ICML, 2011, pp. 8.

Mosabbeb et al., "Multi-View Human Activity Recognition in Distributed Camera Sensor Networks", Sensors, 13, pp. 8750-8770, (Year: 2013).

Wang et al., "Solving Multiple-Block Separable Convex Minimization Problems Using Two-Block Alternating Direction Method of Multipliers", Mathematics of Computation, pp. 1-29 (Year: 2013).

Zhou et al., 3D Shape Estimation from 2D Landmarks: A Convex Relaxation Approach, The IEEE Conference on Computer Vision and Pattern Recognition (CVPR), 2015, pp. 4447-4455 (Year: 2015).

\* cited by examiner

Puzzle
350

| 8 | 2 | 4 | 7 | 3 | 9 | 5 | 1 | 6 |
|---|---|---|---|---|---|---|---|---|
| 5 | 9 | 7 | 8 | 6 | 1 | 4 | 2 | 3 |
| 3 | 6 | 1 | 5 | 4 | 2 | 7 | 8 | 9 |
| 2 | 1 | 5 | 9 | 8 | 6 | 3 | 7 | 4 |
| 4 | 3 | 9 | 1 | 7 | 5 | 8 | 6 | 2 |
| 7 | 8 | 6 | 4 | 2 | 3 | 1 | 9 | 5 |
| 9 | 7 | 3 | 6 | 1 | 4 | 2 | 5 | 8 |
| 1 | 5 | 2 | 3 | 9 | 8 | 6 | 4 | 7 |
| 6 | 4 | 8 | 2 | 5 | 7 | 9 | 3 | 1 |

Fig. 3B

Puzzle
300

|   | 2 | 4 |   | 3 |   | 5 | 1 |   |
|---|---|---|---|---|---|---|---|---|
| 5 |   | 7 |   |   |   | 4 |   | 3 |
|   | 6 |   | 5 |   |   |   | 8 |   |
|   |   |   |   |   |   | 3 |   |   |
| 4 |   |   | 1 |   | 5 |   |   | 2 |
|   |   | 6 |   |   |   |   |   |   |
|   | 7 |   |   |   | 4 |   | 5 |   |
| 1 |   | 2 |   |   |   | 6 |   | 7 |
|   | 4 | 8 |   | 5 |   | 9 | 3 |   |

Fig. 3A

Packing 400

I/O Variabales
550

Graphical Model
500

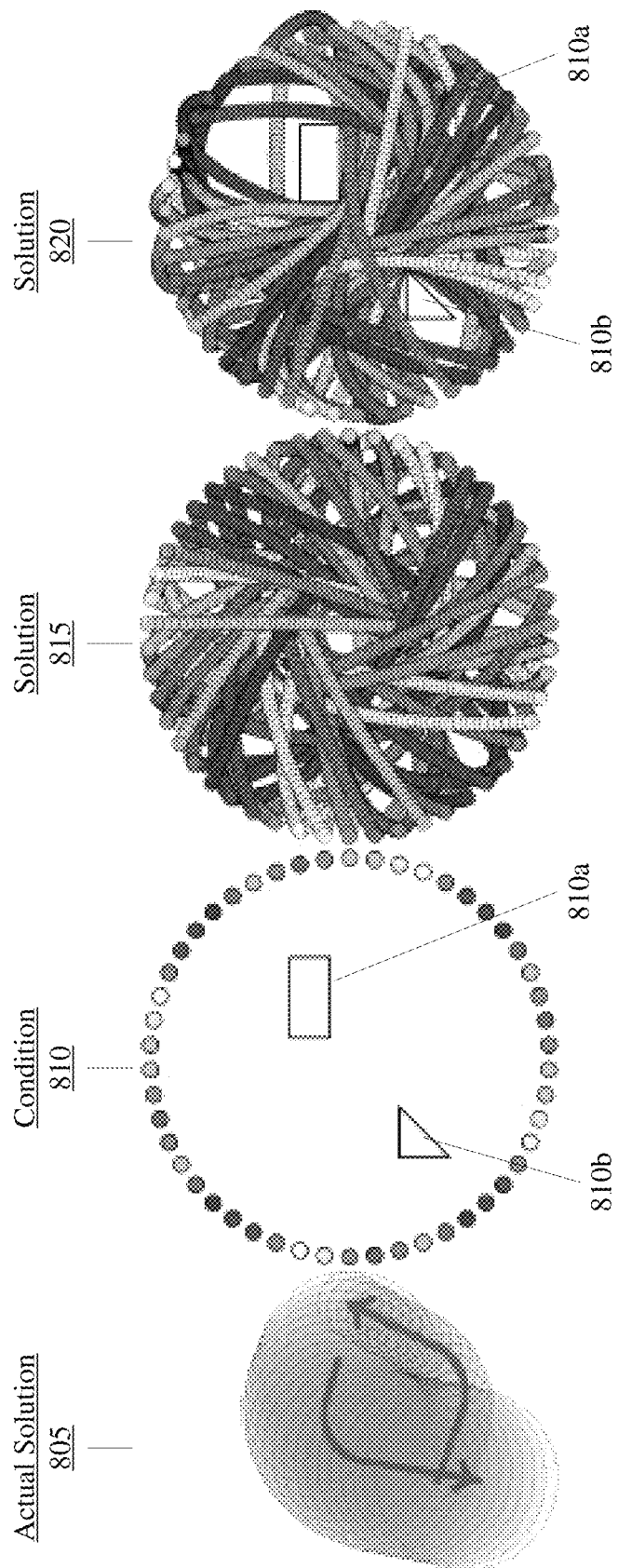

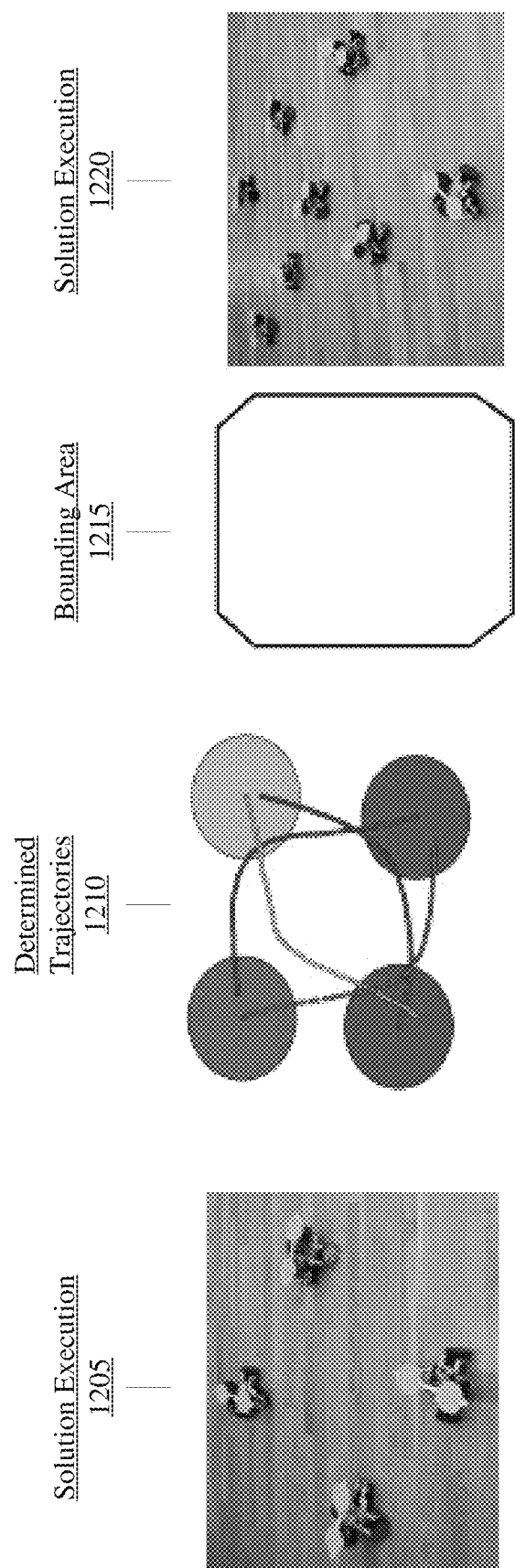

METHOD AND DEVICE FOR THREE-WEIGHT MESSAGE-PASSING OPTIMIZATION SCHEME USING SPLINES

RELATED APPLICATION

The present application claims priority as a Continuation-in-Part application to U.S. Non-Provisional Application Ser. No. 14/107,937 entitled "Method and Device for Three-Weight Message-Passing Optimization Scheme" filed on Dec. 16, 2013 which claims priority to U.S. Provisional Appln. Ser. No. 61/816,305 entitled "Three-Weight Message-Passing Algorithm based on Alternating Direction Method of Multipliers (ADMM)" filed on Apr. 26, 2013, the entirety of both previous applications being incorporated by reference herein.

BACKGROUND INFORMATION

An optimization algorithm may be used to determine a solution for a problem in which the solution considers all variables and constraints related to the problem and provides a lowest cost configuration of the values for all the variables. For example, in a televised event, a plurality of cameras may be used to capture the event. The cameras may move along planned trajectories to fully capture the event. Accordingly, the problem associated with such a scenario may be to determine the planned trajectories for the cameras that incorporate the variables and constraints associated therewith. Such variables and constraints may include no overlap of space as the cameras cannot physically be co-located at a common time, a trajectory path that provides a sufficient video capture of the event, a tracking algorithm for the occurrences during the event, etc. Through incorporation of all these considerations, the optimization algorithm may determine the trajectories of the cameras to provide the lowest cost solution (e.g., least distance to be covered by the cameras, best coverage of the event, least energy requirements, etc.). However, most optimization algorithms require significantly high processing requirements for all these considerations to be assessed as well as provide the lowest cost solution to the problem.

A conventional algorithm used for convex optimization is the Alternating Direction Method of Multipliers (ADMM). Conventionally, the ADMM algorithm is a variant of an augmented Lagrangian scheme that uses partial updates for dual variables. This algorithm has also been utilized and shown to be well-suited for distributed implementations. Further developments in using the ADMM algorithm have included being used in applications such as Linear Programming (LP) decoding of error-correcting codes and compressed sensing.

However, the ADMM algorithm has in practice been used exclusively for convex optimization problems. Convex optimization problems have a special form for the cost objective function, and in particular, only one local optimum exists for a given problem (e.g., a landscape including one valley has a single solution as to what is the lowest point). Many optimization problems of interest, such as the problem of finding optimal trajectories introduced earlier, are not convex. The basic principles behind the ADMM algorithm including the convexity assumptions underlying the derivation of ADMM, appear to provide a gross contradiction to its application to non-convex problems. That is, conventional uses of the ADMM algorithm are not designed for use with general optimization functions. In particular, the ADMM algorithm was not designed as a heuristic optimization algorithm for non-convex Non-Deterministic Polynomial-Time (NP) hard optimization problems. In such problems, multiple local optima exist for a given problem (e.g., a landscape including various hills and valleys has more than one solution as to what is the lowest point as well as the highest point).

Another conventional approach for optimization uses graphical models in which a graph denotes conditional dependencies between random variables. The graphical models often are combined with a Belief Propagation (BP) message-passing algorithm in which inferences are performed on the graphical models. The BP message-passing algorithm calculates the marginal distribution for each unobserved node, conditional on any observed nodes within the graphical model.

BRIEF DESCRIPTION OF THE DRAWINGS

FIG. 3A shows an unsolved puzzle.

FIG. 3B shows a solved puzzle using the device of FIG. 1 according to an exemplary embodiment.

FIGS. 8A-D show a set of conditions and solutions of an optimization problem according to an exemplary embodiment.

FIGS. 12A-D show an application of generating the optimization solution according to an exemplary embodiment.

DETAILED DESCRIPTION

Figure 1:
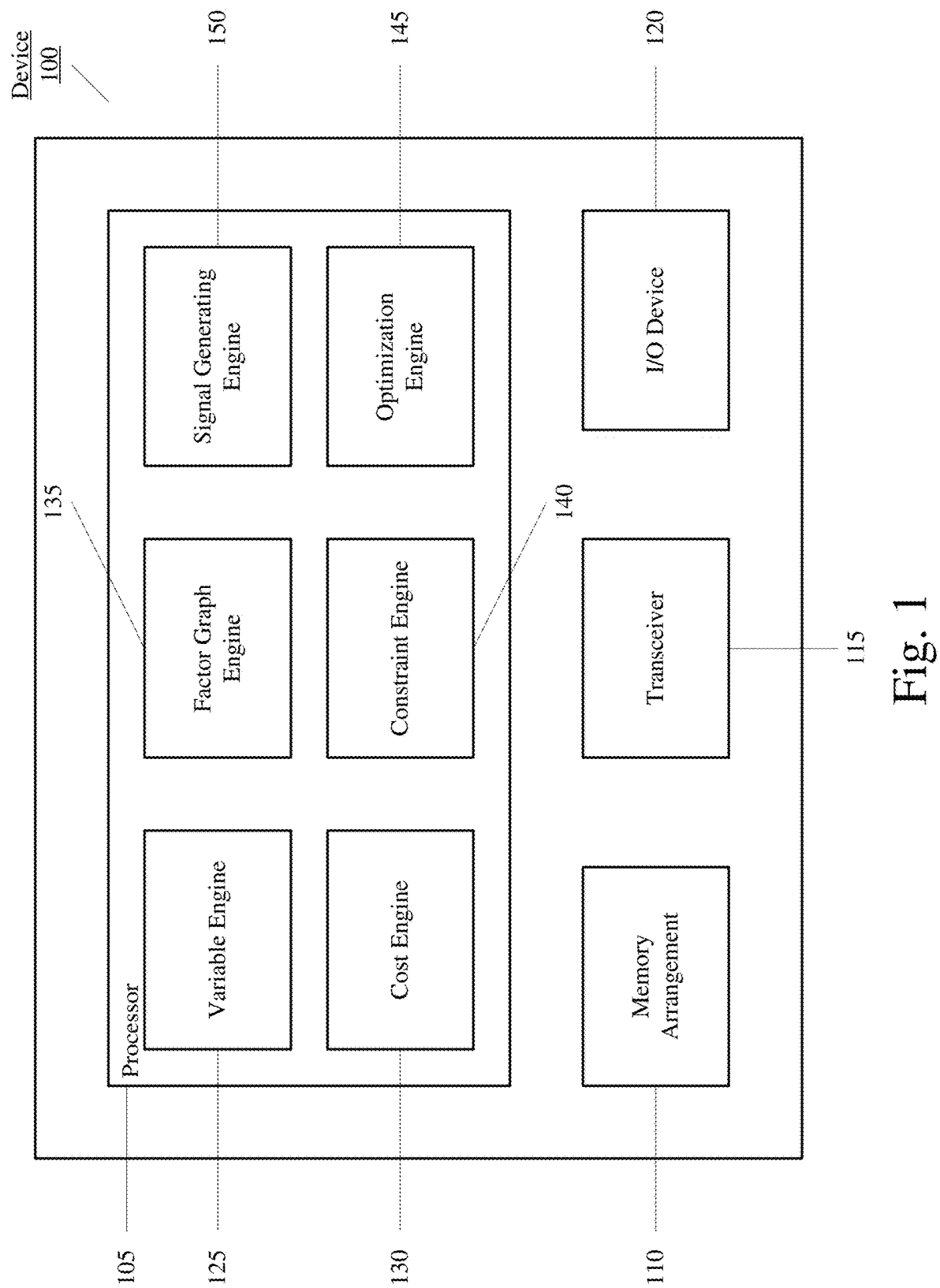
FIG. 1 shows a device for generating an optimization solution according to an exemplary embodiment.

The present invention relates to a device and method for determining an optimization solution for an optimization problem. The method comprises (a) receiving the optimization problem, the optimization problem including a plurality of cost functions and a plurality of variables, the cost functions representing possible costs for values of the variables in the optimization problem, each of the cost functions having a predetermined relationship with select ones of the variables, wherein the variables comprise at least one sub-solution to at least one sub-problem associated with the optimization problem, the sub-solution being a spline indicative of a curved path along an estimated trajectory; (b) generating a first message for each of the cost functions for each corresponding variable based upon the respective predetermined relationship, the first message indicating a first belief that the corresponding variable has a first value when the optimization problem is solved, the first message having a respective first weight indicating a certainty of the first message; (c) generating a second message for each of the variables for each corresponding cost function based upon the respective predetermined relationship, the second message indicating a second belief that the corresponding variable has a second value when the optimization problem is solved the second message having a respective second weight indicating a certainty of the second message; (d) generating a disagreement variable for each corresponding pair of variables and cost functions measuring a disagreement value between the first and second beliefs; (e) repeating steps (b), (c), and (d) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and (f) determining an optimization solution based upon the consensus.

The exemplary embodiments may be further understood with reference to the following description and the appended drawings, wherein like elements are referred to with the same reference numerals. The exemplary embodiments describe a method and device for generating an optimization solution. Specifically, the method and device utilize a message-passing version of the ADMM algorithm. The message-passing algorithm includes a weighting system in which a message passed between nodes of a graphical model has an infinite weight, a standard weight, or an indifferent weight. The optimization solution, the generation thereof, the message-passing algorithm, the ADMM algorithm, the confidence weighting system, and a related method will be described in further detail below.

The exemplary embodiments provide how a Divide and Concur (DC) algorithm for constraint satisfaction may be derived as a specific case of a message-passing version of the ADMM algorithm for convex optimization. The message-passing algorithm is improved upon through introduction of three distinct weights for the messages between nodes of a graphical model with "certain" and "no opinion" weights as well as the standard weight used in both ADMM and DC. The "certain" messages allow the optimization algorithm to implement constraint propagation as a special case while the "no opinion" messages speed convergence for some problems by making the optimization algorithm focus only on active constraints. The three-weight version of message-passing in the ADMM/DC further provides greatly improved performance in non-convex problems while retaining the exact performance of ADMM for convex problems.

The exemplary embodiments overcome the conventional limits of the ADMM algorithm and are used as a well-defined algorithm for general optimization functions and provide a powerful heuristic algorithm even for NP-hard non-convex problems. As will be described in further detail below, when the objective function being optimized by the ADMM algorithm consists entirely of "hard" constraints, the ADMM algorithm reduces to a message-passing version of the DC constraint satisfaction algorithm which is effective for a very wide variety of non-convex constraint satisfaction problems.

As will be described in further detail below, the use of the message-passing algorithm between variables and cost functions in the graphical model enables messages to be sent between these nodes until a consensus is reached; that is, until an optimization solution has been generated. Specifically, messages are transmitted from right side nodes representing a first set of functions to left side nodes representing a second set of functions. The left side nodes process those messages and compute new messages that are transmitted back from left side nodes to the right side nodes. The right side nodes then use the messages that have come from the left side nodes to compute new messages that are sent to the left side nodes, and the cycle continues. The weights associated with the messages are determined such that the messages have an appropriate impact in the processing of the messages to compute new messages. The weights for the messages have one of three different weights. A "certain" weight indicates that a cost function or variable (i.e., one of the nodes) is certain (e.g., 100% confidence) about a value of a variable and all other opinions should defer thereto; a "no opinion" weight indicates that the node has no opinion about the value (e.g., may be omitted in the considerations for the consensus); and a "standard" weight indicates that the message is weighted equally with all other standard weight messages.

FIG. 1 shows a device 100 for generating an optimization solution according to an exemplary embodiment. The device 100 may be any electronic component that is configured to receive and process data such that the generating is performed. The device 100 may include a processor 105, a memory arrangement 110, a transceiver 115, and an input/output (I/O) device 120. The processor 105 may be configured to execute an optimization application. The memory 110 may store data that is received as well as data that is determined. The transceiver 115 and the I/O device 120 may provide a communicative connection to other electronic devices or users such that data may be received for processing. For example, a user may manually enter constraints involved in a particular optimization scenario or problem.

The processor 105 may further execute a plurality of engines that are configured to perform a functionality associated with generating the optimization solution. As illustrated, the processor 105 may execute a variable engine 125, a cost engine 130, a factor graph engine 135, a constraint engine 140, an optimization engine 145, and a signal generating engine 150. The engines will be described in further detail below.

The optimization functionality executed by the processor 105 utilizes a graphical model in order to generate the optimization solution. When relating to optimization, the graphical model includes a first plurality of cost functions and a second plurality of variables, as well as edges connecting cost functions to variables. The cost functions may represent either "soft" costs or "hard" constraints. An edge exists between a cost function and a variable if the variable is involved in the cost function. In a "soft" cost function, the cost function encodes a preference for the connected variables to have particular values, but that preference may be violated, while in a "hard" constraint version of a cost function, the preferences must not be violated. Each cost function may be connected to one or more of the variables and vice versa.

In view of the manner in which the optimization functionality is utilized, the variable engine 125 may receive the set of variables while the cost engine 130 may receive the set of cost functions. The factor graph engine 135 may generate the graphical model for the variables and the cost functions. Through the connections between the cost functions and the variables, the constraint engine 140 may provide the lines of the graphical model to the factor graph engine 135. All this data may be received by the optimization engine 145 that generates the optimization solution. The signal generating engine 150 may generate a signal based upon the generated optimization solution such that a particular application that requires this solution may receive it. For example, a particular application may be trajectories for a plurality of cameras. The signal generating engine 150 may generate signals for each camera that indicate the trajectory at which the camera is to move.

Initially, a message-passing version for the ADMM algorithm is derived. The message-passing algorithm used for the ADMM algorithm as described below may be applied to a completely general optimization problem and not only to convex optimization problems. The general optimization problem may be finding a configuration the values of some variables that minimize some objective function subject to some constraints. The variables may be continuous or discrete. For purposes of this description, the variables are represented as continuous. However, the variables may also be represented as discrete through addition of constraints that enforce the discrete nature of the variables. For example, with a variable that takes on Q discrete labels, Q binary indicator variables may be used to represent whether the original variable is in one of the Q states and each binary variable is represented as a continuous variable but subject to the constraint that exactly one of the Q indicator variables is equal to 1 while the rest are equal to 0.

The processor 105 may receive N continuous variables via the variable engine 125 and represent these variables as a vector $r \in R^N$. The general optimization problem becomes one of minimizing an objective function $E(r)$ subject to some constraints on r. The objective function may be, for example, a cost function. All the constraints are considered to be part of the objective function by introducing a cost function $E_a(r)$ for each constraint such that $E_a(r)=0$ if the constraint is satisfied and $E_a(r)=\infty$ if the constraint is not satisfied. The original objective function $E(r)$ may also be decomposable into a collection of local cost functions. For example, for the problem of minimizing an Ising Model objective function, there is a collection of local cost functions representing the "soft" pairwise interactions and local fields. There are also other cost functions representing the "hard" constraints that each Ising variable may only take on two possible values.

Figure 2:
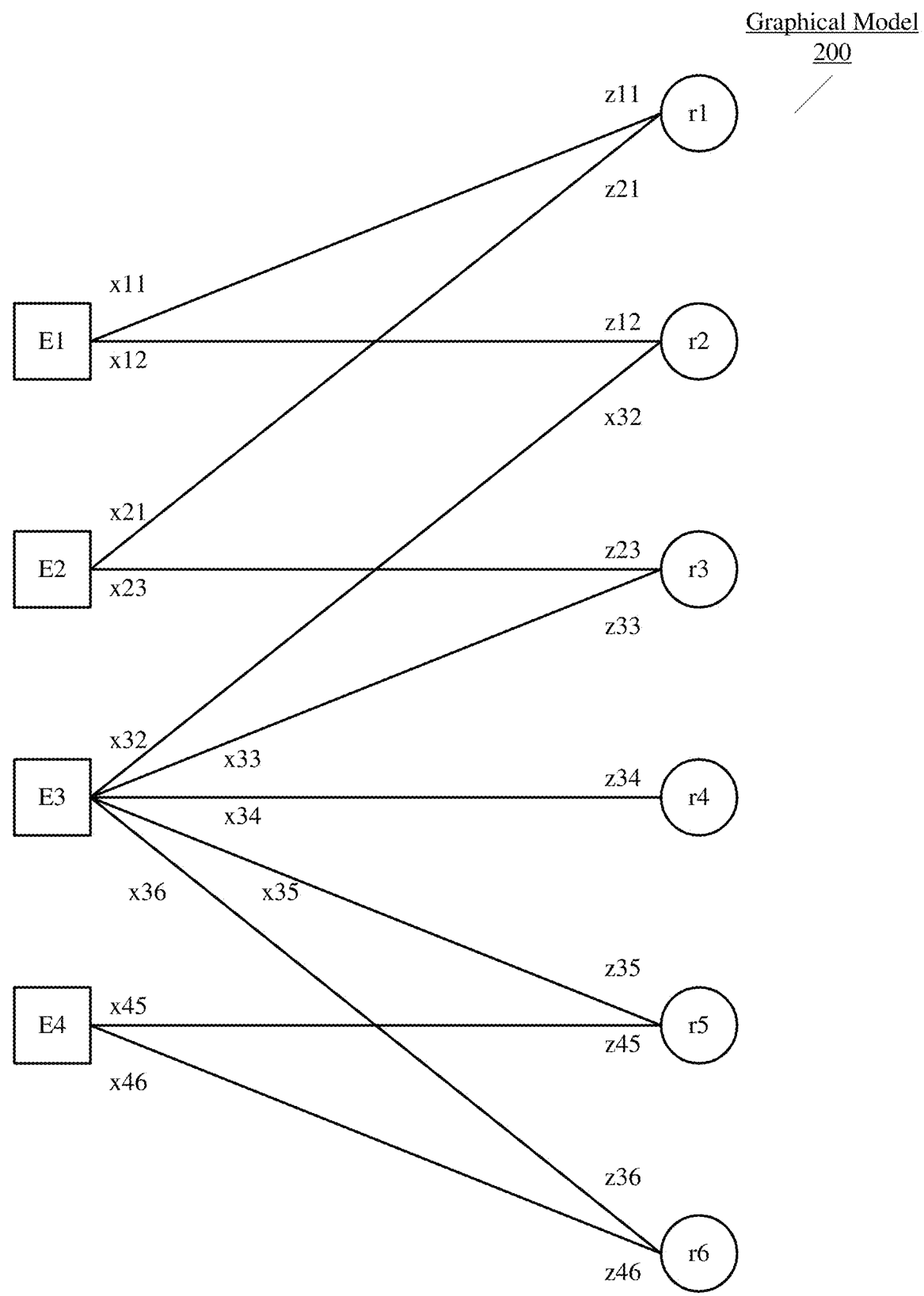
FIG. 2 shows a graphical model according to an exemplary embodiment.

The general problem of minimizing an objective function may be written as $\Sigma_{a=1}^{M} E_a(r)$ where there are M cost functions that are either "soft" or "hard" and $r \in R^n$. Such a problem may have a standard "factor graph" representation. FIG. 2 shows a graphical model 200 according to an exemplary embodiment. Specifically, the graphical model 200 may be the standard "factor graph" for the above described optimization problem.

The graphical model 200 includes a set of hard or soft cost functions E1, E2, E3, and E4 as well as a set of variables r1, r2, r3, r4, r5, and r6. When a line connects a cost function node with a variable node, this indicates that the cost function depends upon the corresponding variable. In order to derive the message-passing algorithm for the ADMM algorithm, the problem may be manipulated into a series of equivalent forms before actually minimizing the objective. The first manipulation is a conversion of the problem over the variables $r_j$ into an equivalent problem that depends on variables $x_{ij}$ that sit on the edges of a "normalized" Forney-style factor graph. The variables in the standard factor graph are replaced with equality constraints and each of the edge variables is a copy of the corresponding variable that was on its right. Thus, the edge variables attached to the same equality constraint must ultimately equal each other but they may temporarily be unequal while they separately attempt to satisfy different cost functions on the left. The below description uses the notation x to represent a vector consisting of the entire collection of $x_{ij}$ edge variables while the notation z represents a vector consisting of the entire collection of $z_{ij}$ edge variables. It is noted that x normally has a higher dimensionality than r.

As illustrated in FIG. 2, the cost function E1 may be connected to the variables r1 and r2. Thus, the cost function E1 has variables x11 and x12. The cost function E2 may be connected to variables r1 and r3. Thus, the cost function E2 has variables x21 and x23. The cost function E3 may be connected to variables r2, r3, r4, r5, and r6. Thus, the cost function E3 has variables x32, x33, x34, x35, and x36. The cost function E4 may be connected to variables r5 and r6. Thus, the cost function E4 has variables x45 and x46. In this manner, the variable r1 may have variables z11 and z21; the variable r2 may have variables z12 and z32; the variable r3 may have variables z23 and z33; the variable r4 may have variable z34; the variable r5 may have variables z35 and z45; and the variable r6 may have variables z36 and z46. It is noted that the graphical model 200 is only one exemplary embodiment of a graphical model that may represent the interconnections between the cost functions and the variables as well as the ensuing copied variables. It is also noted that the number of nodes on each side of the graphical model 200 is only exemplary as more or fewer nodes may exist on each side.

Due to the bipartite structure of a Forney factor graph such as the graphical model 200, the cost functions may be split into two groups: the nodes on the left may represent the original soft cost functions and hard constraints and the nodes on the right may represent equality constraints. Each edge variable $x_{ij}$ sits on a left side of the edge and a copy may be made denoted as $z_{ij}$ that sits on the right side of the edge. The $x_{ij}$ and $z_{ij}$ variables are referred to as "belief" variables because the $x_{ij}$ variables may intuitively be thought of as "beliefs" that the left-hand side of the factor graph has about the values of the original variables $r_j$, while the $z_{ij}$ variables may be thought of as "beliefs" that the right-hand side of the factor graph has about the values of the original variables $r_j$. The objective function $E(x)$ may then be split into a sum of the left cost functions denoted as $f(x)$ and the right cost functions denoted as $g(z)$, where z is a vector made from all the $z_{ij}$ belief variables.

The constraint that each edge belief variable $x_{ij}$ equals its copy belief variable $z_{ij}$ is enforced by a Lagrange multiplier $y_{ij}$ in a Langrangian represented as $L(x,y,z)=f(x)+g(z)+y\cdot(x-z)$. As will be shown below, it is useful to add another term to augment the Lagrangian. Specifically, the term $(\rho/2)(x-z)^2$ may be added. Since x=z at the optimum, this added term is zero at the optimum and non-negative elsewhere. Therefore, the optimum is not changed from addition of this term. The parameter $\rho$ may be considered a scalar value. However, this parameter may also be generalized to be a vector with a different $\rho_{ij}$ for each edge. In summary, the original problem of minimizing $E(r)$ has become equivalent to finding the minimum of the augmented Lagrangian with the following:

$$L(x, y, z) = f(x) + g(z) + y \cdot (x - z) + \frac{\rho}{2}(x - z)^2 \quad \text{(Equation 1)}$$

Accordingly, solving constrained optimization problems is equivalent to a minimization problem that naturally splits into three pieces: (1) minimizing the original soft and hard cost functions $f(x)$ on the left side of the graphical model 200, (2) minimizing the equality cost functions $g(z)$ on the right side of the graphical model 200, and (3) ensuring that the x=z with the Lagranage multipliers y.

To further define the message-passing algorithm for the ADMM algorithm, it may be assumed that each of the local cost functions $f_a(x)$ on the left side of the graphical model 200 is convex. However, it is again noted that the final algorithm is well-defined even when this assumption is violated (i.e., non-convex). All the equality cost functions on the right side of the graphical model 200 are clearly convex and the augmenting of the quadratic terms are convex. Accordingly, the overall function is convex as well. Therefore, the minimum of the Lagrangian may be determined through maximizing the dual function of the following:

$$h(y) = L(x^*, y, z^*) \quad \text{(Equation 2)}$$

where $(x^*, z^*)$ are the values of x and z that minimize L for a particular choice of y:

$$(x^*, z^*) = \underset{x,z}{\operatorname{argmin}} \, L(x, y, z) \quad \text{(Equation 3)}$$

In order to maximize h(y), a gradient ascent algorithm may be used. Thus, given values of $y^t$ at some iteration t, an iterative computation may be performed to obtain $$(x^*, z^*) = \underset{x,z}{\operatorname{argmin}} \, L(x, y^t, z)$$

and then move in the direction of the gradient h(y) according to the following:

$$y^{t+1} = y^t + \alpha \frac{\partial h}{\partial y} = \alpha(x^* z^*) \quad \text{(Equation 4)}$$

where α is a step-size parameter.

The bipartite structure of the graphical model may be used to decouple the minimizations of the belief variables x and z. Introducing a scaled Lagrange multiplier u=y/p and the "messages" $m^t = x^t + u^t$ and $n^t = z^t - u^t$, the following iterative equations which define the message-passing version of ADMM may be obtained.

$$x^t = \underset{x}{\operatorname{argmin}} \, [f(x) + (\rho/2)(x - n^t)^2] \quad \text{(Equation 5)}$$

$$z^{t+1} = \underset{z}{\operatorname{argmin}} \, [g(z) + (\rho/2)(z - m^t)^2] \quad \text{(Equation 6)}$$

$$u^{t+1} = u^t + \frac{\alpha}{\rho}(x^t - z^{t+1}) \quad \text{(Equation 7)}$$

The algorithm is initialized by selecting $u^0 = 0$ and starting with some initial $z^0$. A repeating process may be performed in which (1) Equation 5 determines $x^0$, Equation 6 determines $z^1$, and Equation 7 determines $u^1$, (2) Equation 5 determines $x^1$, Equation 6 determines $z^2$, and Equation 7 determines $u^2$, (3) etc. Intuitively, the z and x variables are analogous to the single-node and multi-node "beliefs" in BP while m and n are messages from the nodes on the left side of the graphical model 200 to those on the right side of the graphical model 200 and vice-versa, respectively, much as in the "two-way" version of the standard BP algorithm. In each iteration, the algorithm computes beliefs on the left side of the graphical model 200 based upon the messages coming from the right side of the graphical model 200, then beliefs on the right side of the graphical model 200 based upon the messages from the left side of the graphical model 200. It may intuitively be said that the messages m indicate the beliefs that the left hand side of the graph has for the values of the r variables that minimize the cost functions, while the messages n indicate the beliefs that the right hand side of the graph has for the values of the r variables that minimize the cost functions. Then the algorithm attempts to equalize the beliefs on the left and right sides of the graphical model 200 using the u variables. It is noted that the u variables keep a running total of the differences between the beliefs on the left and right sides of the graphical model 200 and are similar to control variables tracking a time-integrated difference from a target value. Because they track and try to correct the disagreement between the beliefs of the left and right hand side of the graph, the u variables may be referred to as "disagreement variables" below.

It is also noted that all the updates in the above equations are local computations and may be performed in parallel. Thus, if a function cost a is connected to a small set of edges with belief variables $\{x\}_a$, then it only needs to look at the messages $\{n\}_a^t$ on the same edges to perform its local computation using the following:

$$\{x\}_a^{t+1} = \underset{\{x\}_a}{\operatorname{argmin}} \, [f_a(\{x\}_a) + (\rho/2)(\{x\}_a - \{n\}_a^t)^2] \quad \text{(Equation 8)}$$

These local computations are usually easy to implement with small "minimizing" subroutines (also called "minimizers" below) specialized to the particular $f_a(\{x\}_a)$. Such a subroutine balances the desire to minimize the local $f_a(\{x\}_a)$ with the desire to agree with the $\{n\}_a^t$ messages coming from other nodes. The ρ parameter enables the relative strength to be varied for these competing influences.

The minimizations in Equation 6 are similarly all local computations that may be performed in parallel. Because the $g_a(\{z\}_a)$ functions on the right side of the graphical model 200 all represent hard equality constraints, these minimizations reduce to a particularly simple form (the output belief variables z are given as the mean of the incoming m messages), as will be described in further detail below.

As discussed above, when all the $f_a(\{x\}_a)$ functions are convex, the overall problem is convex and the ADMM algorithm provably converges to the correct global minimum. However, it is noted that no guarantees are made about the speed of convergence. Starting with an arbitrary optimization problem and using Forney factor graphs guarantees that $g_a(\{z\}_a)$ functions on the right side of the graphical model 200 are all equality constraints that are convex. More generally, the ADMM algorithm may be considered to be an algorithm that operates on any functions $f(x)$ and $g(z)$ to provide exact answers so long as $f(x)$ and $g(z)$ are both convex. However, the algorithm is perfectly well defined even for problems where the $f_a(\{x\}_a)$ functions are not convex, as will be described in further detail below.

The message-passing algorithm used with the ADMM algorithm may also be a special case that is a message-passing version of the DC algorithm. Specifically, the special case is for problems where the $f_a(\{x\}_a)$ functions all represent hard constraints. In this case, the legal values of the belief variables $\{x\}_a$ may be written as a constraint set D and require that $f_a(\{x\}_a)=0$ for $\{x\}_a \in D$ and $f_a(\{x\}_a)=\infty$ for $\{x\}_a \notin D$. Then each local minimization to compute $\{x\}_a^{t+1}$ as given by Equation 8 reduces to a projection of the incoming messages $\{n\}_a$ onto the constraint set with the following form:

$$\{x\}_a^{t+1} = P_D(\{n\}_a^t) \qquad \text{(Equation 9)}$$

The reason that Equation 8 reduces to a projection in this case is that the $f_a(\{x\}_a)$ term in Equation 8 enforces that $\{x\}_a$ must be in the constraint set while minimizing the $(\rho/2)(\{x\}_a - \{n\}_a^t)^2$ term enforces that the computed $\{x\}_a$ values are as close as possible (using a Euclidean metric) to the messages $\{n\}_a^t$ which is the definition of a projection.

Similarly, the cost functions $g_a(\{z\})$ represent hard equality constraints such that the $\{z\}_a^{t+1}$ updates may be written as projections of the $\{m\}_a^t$ messages onto the equality constraint sets C with the following:

$$\{z\}_a^{t+1} = P_C(\{m\}_a^t) \qquad \text{(Equation 10)}$$

Assuming that all the $\rho$ weights are equal, this may be further simplified. Specifically, the $\{z\}_a^{t+1}$ values on the edges connected to an equality constraint node are all equal to the mean of the messages incoming to that equality node. However, as will be described in further detail below, the algorithms may go beyond this assumption.

If the step-size parameter $\alpha$ is selected to equal the weight $\rho$, a further simplification may be performed to show that instead of requiring updates of all the variables $x^t$, $z^t$, $u^t$, $m^t$, and $n^t$, the algorithm reduces to an iteration of a single state variable: the messages $m^t$. That is, straightforward algebraic manipulations of Equations 5, 6, and 7 along with the definitions of $m^t$ and $n^t$ permit the elimination of the $x^t$, $z^t$, and $u^t$ variables and reduce to the following message-update equations:

$$n^{t+1} = 2P_C(m^t) - m^t \qquad \text{(Equation 11)}$$

$$m^{t+1} = m^t + P_D(n^{t+1}) - P_C(m^t) \qquad \text{(Equation 12)}$$

This equivalently leaves a single update equation for the $m^t$ messages which utilizes a substantially similar process of the "difference-map" iteration of the DC algorithm as the following:

$$m^{t+1} = P_D(2P_C(m^t) - m^t) - (P_C(m^t) - m^t) \qquad \text{(Equation 13)}$$

It is noted that certain cases exist where the DC algorithm uses the dual version of the difference-map where $n^t$ (is updated according to a rule obtained from Equation 13 by swapping the $P_C$ and $P_D$ projections.

It is again noted that the DC algorithm described above is a special case when used with the ADMM algorithm. However, during the derivation of the above equations, the weights $\rho$ in the ADMM algorithm have disappeared in the DC update equations. The weights for the algorithms described herein have an intuitive meaning in the message-passing algorithm in the ADMM algorithm. Specifically, this intuitive meaning reflects how strongly the messages are to be adhered to in comparison to local function costs. That is, the messages have a "reliability" or "certainty" related thereto. Accordingly, a generalized version of the message-passing algorithm for the ADMM algorithm is determined where each edge (ij) connecting a function cost i to an equality node j is given its own weight of $\rho_{ij}$ reflecting the certainty of messages on that edge. Again, as described above, the message-passing algorithm utilizes three weights $\rho$: (1) a "certain" weight, (2) a standard weight, and (3) a "no opinion" or indifferent weight.

The message-passing algorithm may be further generalized with different weights for messages transmitted from the nodes on the left side of the graphical model 200 to the nodes on the right side of the graphical model 200 in which the weights may be changed with each iteration (i.e., each transmission of the messages). The vector of weights going to the left nodes of the graphical model 200 at a time t may be denoted as $\overleftarrow{\rho}^t$ while the vector of weights going to the right nodes of the graphical model 200 at a time t may be denoted as $\overrightarrow{\rho}^t$. When a particular weight on an edge (ij) is to be denoted, the weights may be modified as $\overleftarrow{\rho}_{ij}^t$ or $\overrightarrow{\rho}_{ij}^t$. It is noted that for a convex problem, the leftward and rightward weights may eventually be equal to each other and may be constant to converge to a global optimum.

Therefore, the modification of the message-passing algorithm is performed with a relatively simple modification that allows for only three possible choices for the weights on each edge. A first weight is the standard weight messages with some weight $\rho_0$ that is greater than zero and less than infinity. The exact choice of $\rho_0$ is important for the rate of convergence for problems with soft cost functions but is irrelevant for problems consisting entirely of hard constraints as is the case for standard DC algorithms. For simplicity, the standard weight $\rho_0$ may be chosen to equal $\rho_0=1$ for such problems. A second weight is for infinite-weight messages which represent the message's value is certainly correct. A third weight is for zero-weight messages which represent that a function cost node or equality node is completely uncertain about the value that a variable is to have and its opinion may be ignored. Therefore, the message-passing algorithm introduces the infinite weight and the zero weight while the standard weight is modified in view of the introduction of the infinite and zero weights.

To modify the message-passing algorithm used with the ADMM algorithm to allow for zero weights and infinite weights, the updating of the $u_{ij}$ variables must be properly handled. The $u_{ij}$ disagreement variables track the "disagreement" between the beliefs of the left and right nodes of the graphical model 200 on an edge (ij). The $u_{ij}$ disagreement variable on an edge grows in magnitude over time if the left belief $x_{ij}$ is persistently less than or persistently greater than the right belief $z_{ij}$. Because the $u_{ij}$ disagreement variables are added or subtracted to the beliefs to form the messages, the message values become different from the actual belief values as the $u_{ij}$ disagreement variables attempt to resolve the disagreement. With infinite and zero weight messages, the algorithms utilize a "reset" for the $u_{ij}$ disagreement variables to zero if there is no disagreement on that edge. For example, when an infinite weight message is sent on an edge, it may indicate that the message is certainly correct such that any previous disagreement recorded in the $u_{ij}$ variable is to be ignored.

In order to utilize these weights in the message-passing algorithm in the ADMM algorithm, all the $u_{ij}$ disagreement variables may be set to equal 0 initially. Thus, $u_{ij}=0$. Accordingly, zero weights (e.g., $\overleftarrow{\rho}_{ij}^0=0$ on each edge) may normally be used for the initial $n^0$ messages from the right node to the left node for the variables in which no information is received. For any variables for which there is a certainty, these messages may be accompanied with infinite weights. The $x^0$ belief may be computed using the standard update equations with the following:

$$x^t = \underset{x}{\operatorname{argmin}}\ [f(x) + (\vec{\rho}^t/2)(x - n^t)^2] \qquad \text{(Equation 14)}$$

Any ties in the $x^t$ updates may be broken randomly. The left-to-right messages $m^t$ are computed using $m^t = x^t + u^t$ but since $u^0 = 0$, the initial messages to the right equal the initial $x^0$ beliefs.

The outgoing $\vec{\rho}^t$ weights are computed using an appropriate logic for the function cost on the left that depend on an analysis of the function. For example, as will be described in further detail below, with a mathematical puzzle such as a Sudoku puzzle, only standard or infinite weights may be transmitted depending on a logic that sends out infinite weights when there is a certainty about the corresponding x value. Whenever an infinite weight is used, whether for a right-going message or a left-going message, the $u_{ij}^t$ variable for that edge is immediately reset to zero.

The $z^{t+1}$ right beliefs may be computed by taking a weighted average of the $m^t$ messages weighted by the $\vec{\rho}^t$ weights. Thus, if any message has an infinite weight, it controls the average while any zero-weight message contributes nothing to the average. If the logic used to send infinite weights is correct, there are no contradictions between infinite weight messages.

To compute the weights returning to the left from an equality node (right nodes), the following logic may be utilized. First, if any edge is sending in an infinite weight $\vec{\rho}_{ij}^t$, all edges out of the equality node return an infinite weight $\vec{\rho}'_{ij}^{t+1}$. Otherwise, all edges return a standard weight $\vec{\rho}'_{ij}^{t+1}$ as long as at least one of the incoming weights is non-zero. Finally, if all incoming weights $\vec{\rho}_{ij}^t$ are zero, the outgoing weights $\vec{\rho}'_{ij}^{t+1}$ are also set to zero.

The logic continues with all u disagreement variables being updated. Any $u_{ij}$ disagreement variable on an edge that has an infinite weight in either direction is reset to zero. Also, any edge that has a zero weight $\vec{\rho}_{ij}^t$ has its u variable reset to zero (the reasoning is that there is no contribution to the average and should agree with the consensus of the rest of the system). Any edge that has a standard weight $\vec{\rho}_{ij}^t$ while all other edges into its equality node have zero weight has its u disagreement variable reset to zero (the reasoning again is that there was no disagreement so there is no longer any need to modify the right belief). Any other edge that has a standard weight $\vec{\rho}_{ij}^t$ and a standard weight $\vec{\rho}_{ij}^{t+1}$ will have its $u_{ij}^{t+1}$ disagreement variable updated according to the formula $u_{ij}^{t+1} = u_{ij}^t + (\alpha/\rho_0)(x_{ij}^t - z_{ij}^{t+1})$. Once the u variables are updated, all the right-to-left messages $n^{t+1}$ may be updated according to the formula $n_{ij}^{t+1} = z_{ij}^{t+1} - u_{ij}^{t-1}$.

The above description describes one iteration of the optimization algorithm. This process may repeat until stopping criterion is satisfied in which all the m and n messages are identical from iteration to iteration to some specified numerical tolerance.

As will be described in further detail below, the exemplary three-weight messaging algorithm exhibits several properties that make it ideal for cognitive systems. In a first example, the exemplary three-weight messaging algorithm operates on arbitrary objective functions (e.g., non-linear, non-convex), constraints (e.g., hard, soft, mixed), and variables (e.g., discrete, continuous). The three-weight message-passing algorithm converges to a global minimum for convex problems and, if it converges, the three-weight message-passing algorithm arrives at a feasible solution (e.g., all hard constraints are met). In a second example, the exemplary three-weight message-passing algorithm is an iterative algorithm and, for many problems, intermediate results serve as heuristic input for warm-starting complementary approaches. In a third example, the exemplary three-weight message-passing algorithm takes the form of a decomposition-coordination procedure in which the solutions to small local subproblems are coordinated to find a solution to a large global problem. The algorithmic structure leads naturally to concurrent processing at multiple levels of execution (e.g., MapReduce, multi-core, GPU).

As discussed above, the exemplary optimization algorithm may be interpreted as an iteration loop that consists of two phases: (1) minimizing each cost function locally, and (2) concurring on the result of the local computation. The messages of the three-weight message-passing algorithm operate on the edges of the corresponding graphical model as opposed to directly on variables which raises the dimensionality of the problem, thereby allowing the exemplary three-weight message-passing algorithm to more effectively search the variable space and avoid invalid solutions.

To summarize, the minimization phase takes an input pair of message and weight for each edge and produces, for each edge, a corresponding output pair by using Equation 14. The set of variable values jointly minimize the sum of the local cost function while remaining close to the incoming message set as balanced by each edge's weight. Proper use of the three weight classes lead to dramatic performance gains (as will be explained below) and is crucial for integration with higher-level knowledge. The logic that implements this minimization step may itself be a general optimization algorithm but also be customized to each cost function in which the custom minimization almost always leads to improvements in algorithm performance and is typically the bulk of the implementation effort. The concur phase combines incoming messages about each variable from all associated local cost functions and computes a single assignment value using a fixed logic routine (e.g., a weighted average). After each variable node has concurred, it is possible to extract this set of values as the present solution state.

Each message incorporates both an assignment value and an accumulation over previous disagreements between the value computed by a local cost function and the concurred variable value. Due to this disgreement variable term, each edge, even those connected to the same variable node, often communicates a different message (i.e., each edge has a different view of the variable as informed by an aggregation over local iteration history). The three-weight message-passing algorithm converges when outgoing messages from all variable nodes do not change significantly between two subsequent iterations.

All message passing data is local to each edge within the graphical model and it is trivial to coarsely parallelize the two main phases of the algorithm (i.e., all factors may be minimized in parallel and then all variables may be concurred upon in parallel). For complex cost functions, fine grained parallelization within the minimization routine may lead to additional performance gains.

The following description relates to the utility of non-standard weights (i.e., infinite weight and zero weight) on non-convex problems. In a first non-convex problem, a constraint satisfaction puzzle such as Sudoku is illustrated. The optimization algorithm (i.e., message-passing algorithm used with the ADMM algorithm) is allowed to propagate certain information in which infinite weights are useful. In a second non-convex problem, a circle packing scenario is illustrated. The optimization algorithm is allowed to ignore irrelevant constraints in which zero weights are useful.

FIG. 3A shows an unsolved puzzle 300 while FIG. 3B shows a solved puzzle 350 using the device 100 of FIG. 1 according to an exemplary embodiment. Specifically, the optimization functionality executed by the processor 105 may be used for a Sudoku puzzle in order to successfully solve the unsolved puzzle 300. Again, the infinite weights provide invaluable information for such a non-convex problem.

A Sudoku puzzle is a partially completed row-column grid of cells partitioned into N regions, each of size N cells to be filled in using a prescribed set of N distinct symbols such that each row, column, and region contains exactly one of each element of the set. A well-formed Sudoku puzzle has exactly one solution. The Sudoku puzzle is an example of an exact-cover constraint-satisfaction problem and is NP-complete when generalized to N×N grids. Generally, the Sudoku puzzle is a 9×9 grid containing nine 3×3 regions such as the unsolved puzzle 300. However, as will be explained in further detail below, the optimization algorithm of the exemplary embodiments is designed to generate the solution regardless of the size or configuration of the puzzle.

To represent an N×N square-in-square Sudoku puzzle as an optimization problem, $O(N^3)$ binary indicator variables and $O(N^2)$ hard constraints may be used. For all open cells (those that have not been supplied as "clues"), a binary indicator variable may be used, designated as v(row,column,digit), to represent each possible digit assignment. For example, the variables v(1,3,1), v(1,3,2), . . . v(1,3,9) represent that the cell in row 1, column 3 can take values 1 through 9. A hard "one-on" constraint may be applied to enforce digit distinctiveness: a—one-on constraint requires that a single variable is "on" (e.g., 1.0) and any remaining are "off" (e.g., 0.0). One-on constraints may be applied to four classes of variable sets:

(1) ∀r∀c{v(row,col,dig): row=r,col=c}
  one digit assignment per cell
(2) ∀r∀d{v(row,col,dig): row=r,dig=d}
  one of each digit assigned per row
(3) ∀c∀d{v(row,col,dig): col=c,dig=d}
  one of each digit assigned per column
(4) ∀s∀d{v(row,col,dig): sq(row,col)=s,dig=d}
  one of each digit assigned per square The exemplary optimization algorithm integrates an implementation of infinite weights within the one-on minimizers that serve to reduce the search space of the problem instance. The introduction of messages that are certain using the three-weight message-passing algorithm improves the time-to-solution, particularly in puzzles where constraint propagation is sufficient to logically deduce most or all of the puzzle solution with no search being required.

To interpret the Sudoku puzzle as nodes of the graphical model, each hard one-on constraint is implemented as a cost function on the left side of the graphical model. For this class of constraint, minimizing Equation 8 involves a linear scan: select the sole "on" edge as that which is certain and "on" for $\bar{\rho}'^t_{ij}=\infty$ and $n_{ij}^t=1.0$ or, in absence of such an edge, that with the greatest incoming message value and a standard weight.

Outgoing weights $\vec{\rho}_{ij}^t$ default to $\rho_0$ with three exceptions. In a first exception, if a single edge is certain and "on" for $\bar{\rho}'^t_{ij}=\infty$ and $n_{ij}^t=1.0$, all outgoing assignments are certain. In a second exception, if all but a single incoming edge is certain and "off" for $\bar{\rho}'^t_{ij}=\infty$ and $n_{ij}^t=0.0$, all outgoing assignments are certain. In a third exception, incoming certainty for an edge is maintained in its outgoing weight for $$\bar{\rho}'^t_{ij}=\infty \Rightarrow \vec{\rho}_{ij}^t=\infty.$$

Using the exemplary optimization algorithm in which the three-weight message-passing algorithm is utilized with the ADMM algorithm, Sudoku puzzles that represent the problem may be solved with increased efficiency, specifically from the introduction of the infinite weight. For example, experimental evidence of the use of the optimization algorithm has shown that an overall median improvement from using the exemplary optimization algorithm results in a 4.12× reduction in iterations with a maximum improvement of 61.21× on a single puzzle.

Figure 4:
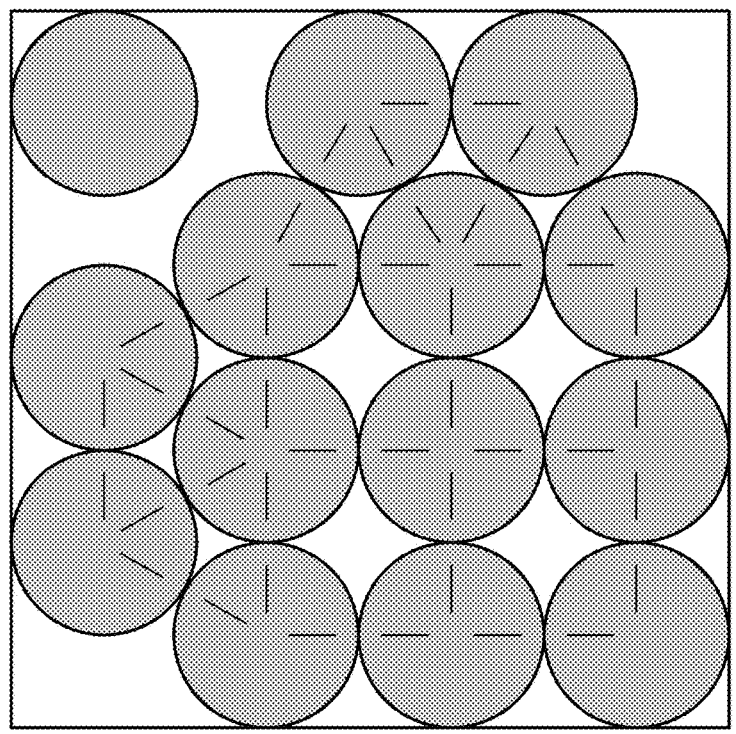
FIG. 4 shows a packing problem and solution using the device of FIG. 1 according to an exemplary embodiment.

FIG. 4 shows a packing problem and solution 400 using the device 100 of FIG. 1 according to an exemplary embodiment. Specifically, the optimization functionality executed by the processor 105 may be used for a circle packing problem in order to successfully determine the solution. In this instance, the zero weights provide invaluable information for such a non-convex problem.

Circle packing is a problem of positioning a given number of congruent circles in such a way that the circles fit fully in a square without overlapping. A large number of circles makes finding a solution difficult due in part to the coexistence of many different circle arrangements with similar density. For example, as shown in FIG. 4, the packing may be rotated across either or both axes and the free circle in the upper-right corner (a "free circle" or a "rattle") may be moved without affecting the density of the configuration.

To represent a circle-packing instance with N objects as an optimization problem, O(N) continuous variables and $O(N^2)$ constraints may be used in a substantially similar manner as discussed above with the Sudoku puzzle. Each object may have two variables: one representing each of its coordinates (or more generally, d variables for packing spheres in d dimensions). For each object, a single box-intersection constraint may be created that enforces that the objects stays within the box. Furthermore, for each pair of objects, a pairwise-intersection constraint may be created that enforces that no two objects overlap. The description below illustrates how the zero-weight messages in the three-weight message-passing algorithm used with the ADMM algorithm provides an improvement compared with a ADMM/DC approach and may be applied more generally to a variety of problems where local constraints that are "inactive" may otherwise send messages that would slow progress towards convergence.

Initially, both types of intersection constraints are implemented as cost functions on the left side of the graphical model 200. Box-intersection functions send messages of standard weight $\rho_0$ for circles sending n messages outside the box to have an x position at the nearest box boundary. For those circles that are not outside the box, a zero-weight message is sent to stay at the present position such that $\vec{\rho}_{ij}^t=0$ and $x_{ij}^t=n_{ij}^t$. Pairwise-intersection functions are analogous: intersecting circles are sent standard weight messages reflecting updated x positions obtained by moving each circle along the vector connecting them such that Equation 14 is satisfied (e.g., if both circles send equal weight messages, they are moved an equal amount; if one has a standard weight and one has a zero weight, only the circle sending a zero-weight message is moved), while non-intersecting circles are sent zero-weight messages to remain at their present locations ($x_{ij}^t = n_{ij}^t$).

A comparison between iterations-to-convergence for a small number of circles (e.g., N=1 . . . 24) in a square between the three-weight message-passing algorithm used with the ADMM algorithm and the conventional ADDM algorithm (using only standard weights for message passing) has illustrated an improvement. For example, with four random conditions per N, $\rho_0=1$, and $\alpha=0.01$, for N<20, the three-weight message-passing algorithm improved performance of 42% of experimental trials of double or more with a median improvement in iterations being around 1.77×. However, for N≥20, the three-weight message-passing algorithm showed improvements of double or more on 90% of experimental trials with a median improvement being more than 116×. The results have shown that only a logarithmic growth in iterations occurred as N increased using the exemplary three-weight message-passing algorithm such that fewer than 1,220 iterations were required after N=901. However, the ADDM algorithm using only standard weights resulted in a quadratic increase to require more than 187,000 iterations. In the standard ADMM/DC approach, each circle is effectively being sent a message to stay where it is by every other circle in the system that is not overlapping with it and this may tremendously slow down convergence, particularly when N grows larger. By allowing for zero-weight messages from constraints that do not care about the location of a circle, the three-weight message-passing algorithm used with the ADMM algorithm becomes focused on those constraints that are relevant.

Although the examples described above relate to how using a particular weighted message provides an advantage in determining an optimization solution for a specific problem, those skilled in the art will understand how utilizing all three weighted messages in the three-weight message-passing algorithm used in the ADMM algorithm provide a combined improvement to solve convex and non-convex problems much faster than using DC algorithms and have important advantages over more widely used BP algorithms. Specifically, messages and beliefs in BP algorithms are probability distributions while ADMM uses a single value representing a current best guess for a variable; ADMM-based algorithms easily handle constraints that would be awkward to deal with in BP algorithms such as the constraint that circles cannot overlap in the circle-packing problem; and ADMM-based algorithms only converge to fixed points that satisfy all hard constraints in the problem whereas BP algorithms potentially converge to fixed points that fail to satisfy all the hard constraints. An application of the three-weight message-passing algorithm used in the ADMM algorithm will be discussed in further detail below in which the optimization algorithm may be used to solve a multi-agent trajectory planning problem.

The optimization algorithm using the three-weight message-passing algorithm applied to the ADMM algorithm may consider a variety of factors to further improve generating an optimization solution. Specifically, an approach to generating the optimization solution for quickly and flexibly developing hybrid cognitive capabilities that are efficient, scalable, and exploit knowledge may improve the speed and quality at which the optimization solution is found. The integration of knowledge with the exemplary optimization algorithm may result in improving expressiveness, efficiency, and scaling. The adjustment to the optimization algorithm by integrating knowledge will again be described with regard to a Sudoku puzzle and a circle packing problem.

The following description relates to an intermediate approach between highly specialized algorithms and uniform computation such that a hybrid architectural substrate seeks to leverage optimization over factor graphs or graphical models using the three-weight message-passing algorithm used with the ADMM algorithm as a general platform upon which to rapidly and flexibly develop diverse cognitive-processing modules. The integration of higher-level knowledge into the operation of the three-weight message-passing algorithm may utilize a variety of approaches. Two exemplary approaches include reasoner hierarchy and graph dynamics. These techniques are general and, when specialized for a particular problem, may lead to improved algorithm efficiency (iterations and wall-clock time), scaling, and expressiveness of constraints and heuristics. Accordingly, the processor 105 of the device 100 may further include a reasoner engine (not shown) as well as a graph dynamics engine (not shown), both engines providing data to the optimization engine 145 to generate the optimization solution.

With regard to reasoner hierarchy, the three-weight message-passing algorithm may be augmented to introduce a two-level hierarchy of local and global reasoners. Local reasoners may be implemented as a special class of factor within the program graph. Local reasoners may also be able to send/receive messages like other factors but incoming message values always reflect the concurred upon variable value. The default operation of the local reasoners is to send zero-weight messages (having no impact on the problem) but in particular circumstances, the local reasoners may also affect change through non-zero weight messages. Local reasoners may also have a Reason method that supports arbitrary logic. This class of reasoners may also be considered local due to its local view of the problem via connected variables (to thereby be executed concurrently). However, the added reasoning step affords communication with global reasoners. Global reasoners may be implemented as code modules via a single Reason method and are not connected to the problem graph. Instead, the global reasoners have a global view of the problem via access to the concurred values of any variable, as well as any information transmitted via local reasoners. Global reasoners may affect the problem via three main methods: (1) requesting that local reasoners send non-zero weighted messages, (2) detecting problem-specific termination conditions and halting iteration, and (3) modifying the problem graph.

A major reason for a hierarchy of reasoners is to exploit parallelism in order to better scale to large problems. Thus, where possible, local reasoners serve as a filtering step such that global reasoners need not inspect/operate on the full variable set. For example, as will be described in further detail below, with the Sudoku puzzle, the hierarchy yields an event-based discrimination network where the local reasoners pass along information about changes to possible cell states and a global reasoner implements relational logic that would be difficult and inefficient to represent within the graphical model of the problem. Local reasoners may filter for certain information (e.g., when weights are infinite), propagate implications to global reasoning, and express certain results in outgoing messages. Again with the Sudoku puzzle, propagating certainty via the reasoner hierarchy maintains real-time reactivity for very large problem instances by pruning unnecessary constraints.

Accordingly, the two-level reasoner hierarchy improves the exemplary three-weight message-passing algorithm along several dimensions. In a first example, global reasoners may implement arbitrary logic, including complex indexing structures, search algorithms, etc. Information may be extracted from the problem, optionally filtered through local reasoners; processed via the global reasoner; and then re-integrated through the interface of message, weight pairs in the local reasoners. Certainty weighting (i.e., infinite weights) allows for fluid integration with processing mechanisms that operate over symbolic representations. In a second example, the two-level hierarchy supports relational reasoning over the inherently prepositional graphical model representation without incurring combinatorial explosion. The global reasoner may incorporate richer representations such as rules, higher-order logics, explicit notions of uncertainty, perceptual primitives, etc. In a third example, operations of the local reasoners may be parallelized in the same way as factor minimization and variable-value concurrence in the problem graph. Furthermore, effective use of local filtering may greatly reduce the set of variables considered by global reasoners, thereby supporting scaling to large, complex problems.

With regard to graph dynamics, integrating knowledge may support four classes of graph dynamics by global reasoners: (1) adding/removing edges (variables nodes may be automatically pruned if there are no remaining incoming edges); (2) adding/removing factor nodes (removing a factor node has the effect of removing any incoming edges); (3) adding new variables; and (4) re-parameterizing factors. These actions enable adapting the representation of a single problem instance over time as well as reusing a single mechanism for multiple problem instances.

Removing graph edges and factors has two main effects: (1) potentially changing variable assignments and (2) improving runtime performance. First, if an edge is disconnected from a factor/variable node, the outgoing variable assignments are now no longer dependent upon that input, and therefore the objective cost may yield a different outcome. Second, while removing an edge is analogous to sending a zero-weight message, the system is no longer required to expend computation time and thus, wall-clock time, per iteration, may improve. That is, processing requirements may be decreased in an overall sense.

The ability to add and remove edges allows the graph to represent and reason about dynamically sized sets of variables. For example, in the Sudoku puzzle, the three-weight message-passing algorithm may consider a set of possible symbols for each cell and reduce its option set over time as logically certain assignments are made within the row/column/square. That is, infinite weights may be applied in which again, the processing requirements may be decreased.

Supporting factor re-parameterization may support numerous capabilities. First, it is possible to reflect incremental environmental changes without having to reconstruct the graph. It is also possible to reflect changes to the objective function which may come about due to environmental change, task transitions, dynamic agent preference/goals, etc. Additionally, repurposing existing factors helps keep memory costs stable that support scaling to large, complex problems.

Accordingly, graph dynamics improves the three-weight message-passing algorithm along several dimensions. In a first example, global reasoners may dynamically restructure and reconfigure the problem graph to reflect changes in the state of the environment, task structure, as well as agent preferences, goals, and knowledge. In a second example, changing edge connectivity supports dynamic sets of variables without the necessity of enumerating all possibilities. In a third example, performance of the three-weight message-passing algorithm iteration loop depends upon the size of the graph that may be dynamically maintained such as to represent only those factor nodes, variables, and edges that are necessary.

As discussed above, the knowledge integration in the three-weight message-passing algorithm may be applied for a variety of problems, convex and non-convex. That is, the knowledge integration manner may be used for determining a solution for a general optimization problem. To illustrate how the knowledge integration is used, exemplary problems such as Sudoku and circle-packing show how this modification to the three-weight message-passing algorithm further improves convergence and further reduces processing requirements to generate the optimization solution.

With regard to a Sudoku puzzle, a local reasoner may be added per cell of the puzzle with the express purpose of maintaining the set of possible digit assignments (i.e., the values for which there was not a certain message for the "off" binary indicator variable discussed above) and, when a possibility was removed, communicate this information to a global reasoner. The global reasoner may utilize this information to improve solver efficiency and performance by utilizing graph dynamics to reduce the problem search space. Specifically, when a possibility is no longer viable logically, the global reasoner may remove four edges (those that connected the binary indicator variable to the constraints of the cell, row, column, and square) as well as any factors that are left without an option in the process. The graph dynamics reduce the problem-graph size by removing constraints as they became unnecessary and thereby improved iteration time of the second phase of numerical solving. Experimental data has shown that the integration of knowledge into the three-weight message-passing algorithm further improves upon the already improved manner of utilizing the three-weight message-passing algorithm in the ADMM algorithm for solving Sudoku puzzles.

Accordingly, with regard to Sudoku puzzles, local reasoners were used to create an efficient and scalable discrimination network of possibility-set changes for consumption by a global reasoner. A global reasoner responded to changes in possibility-sets in order to implement graph dynamics. The graph dynamics pruned the problem set size (more than an order of magnitude for large puzzles) and had the result of improving efficiency and scaling, including reactive iterations for the largest puzzles.

With regard to circle packing, the knowledge integration manner may be used for two distinct purposes: (1) drastically improving scaling via R-tree integration and (2) macro movements via human assistance. As discussed above, using zero-weight messages for inactive constraints improves iterations-to-convergence for circle packing. However, $O(N^2)$ intersection constraints are still required and thus, iteration-loop time (msec/iteration) still prevents scaling to large numbers of circles. However, R-trees provide an efficient detection of intersections of spatial objects. Since the three-weight message-passing algorithm tends to move circles in a local fashion, a graph dynamics global reasoner that integrates an R-tree to add/remove intersection constraints for each iteration may be used. Initially, the R-tree may be updated with the locations of all circles via concurred variable values. Axis-aligned bounding boxes (AABBs) may describe object locations and add a 5% "neighborhood" buffer to each box. All object intersections may be queried and categorize them as either existing or new based upon a current graphical model. The algorithm may iterate over factors in the problem graph such as (1) for existing intersections with corresponding factors, perform nothing and (2) for those factors that are no longer intersecting (or in the neighborhood buffer), these factors are removed from the graph and added to a "pool" of constraints. For all new intersections, a constraint may be added to the graphical model to reconfigure past factors if available in the pool. Therefore, only those objects that are in the graph need to be updated in the R-tree since those are the only coordinates the three-weight message-passing algorithm have altered. The knowledge integrated three-weight message-passing algorithm scales with the number of active factors and intersections which is small compared to the full $O(N^2)$ intersection constraint set. Old factors may be pooled to re-parameterize them dynamically in order to bound memory consumption. Experimental data has shown that the integration of knowledge into the three-weight message-passing algorithm further improves upon the already improved manner of utilizing the three-weight message-passing algorithm in the ADMM algorithm for solving circle packing problems.

It is noted that because the iteration dynamics of circle packing includes the three-weight message-passing algorithm to make local changes to circle positions, it may be difficult for the knowledge integrated three-weight message-passing algorithm to make larger, coordinated movements to escape local minima. Accordingly, this algorithm may incorporate two sets of reasoners for human assistance (via the I/O device 120) into the low-level circle-packing optimization problem. The first implementation requires only a single local reasoner where a user clicks on and drags a circle in an interface. The coordinates of the resulting position may be sent as weighted messages to the circle's coordinate variables (such that graph dynamics are used to connect the local-reasoner factor on demand). The inclusion of such "knowledge" significantly improves upon the already improved three-weight message-passing algorithm. For example, the global reasoner may extract meta-data from the R-tree intersections to identify the circle with the largest current overlap in which the user may identify a free or open space. The local reasoner may transport (via weighted messages) the "distressed" circle to the "vacant" region. Accordingly, this may decrease iterations-to-convergence.

Accordingly, with regard to circle packing problems, a local reasoner may integrate manual inputs from a user. A global reasoner may integrate an R-tree with the main iteration loop for improved efficiency and problem-size scaling as well as to inform user-assisted packing via an integration of intersection metadata. Graph dynamics may maintain the set of constraints as informed by the R-tree. These constraints may re-parameterize to limit memory usage.

As discussed above, one application for using the three-weight message-passing algorithm with the ADMM algorithm relates to planning trajectories for a plurality of agents such as cameras, robots in an amusement park, etc. That is, the exemplary optimization algorithm may compute collision-free global trajectories for p agents with specified initial and final configurations. In a particular embodiment, a specialization of the exemplary optimization algorithm may be used for local motion planning by solving the problem of joint optimization in velocity space. As will be described in further detail below, the three-weight message-passing algorithm improves upon an efficiency in generating an optimization solution for this problem. For example, the advantages described above in the examples regarding Sudoku and circle packing may be incorporated into generating the optimization solution for a multi-agent trajectory planning problem.

Robot navigation relies on at least three subtasks. The subtasks may include localization, mapping, and motion planning. Motion planning may be described as an optimization problem in which the lowest cost path (i.e., trajectory) is computed between an initial and final configuration. Trajectory planning for multiple agents is an important problem in robotics, computer animation, and crowd simulation. Conventional methods of generating the trajectory planning solution prioritize agents and compute trajectories sequentially which ultimately lead to suboptimal solutions. In contrast, the exemplary optimization algorithm plans for all agents simultaneously by taking advantage of the parallelization feature.

The exemplary optimization algorithm may perform the task of determining a global trajectory planning in the following manner. Given p agents of different radii $\{r_i\}_{i=1}^P$ with a given desired initial position $\{x_i(0)\}_{i=1}^P$ and final position $\{x_i(T)\}_{i=1}^P$, along with a cost function over trajectories, collision-free trajectories may be computed for all agents that minimize the cost function. That is, a set of intermediate points $\{x_i(t)\}_{i=1}^P$ may be found, where $t \in (0,T)$, that satisfy the "hard" collision-free constraints of $\|x_i(t)-x_j(t)\| > r_i + r_j$ for all i, j, and t and that minimizes the cost function.

The manner of utilizing the exemplary optimization algorithm searches for a solution within the space of piece-wise linear trajectories where the trajectory of an agent is completely specified by a set of positions at a fixed set of time instants $\{t_s\}_{s=0}^n$. These time instants may be defined as break-points which are the same for all agents to simplify the description below. All other intermediate points of the trajectories may be computed by assuming that each agent moves with constant velocity in between break-points. That is, if $t_1$ and $t_2 > t_1$ are consecutive break-points, then $$x_i(t) = \frac{1}{t_2 - t_1}((t_2 - t)x_i(t_1) + (t - t_1)x_i(t_2))$$

for $t \in [t_1, t_2]$.

Along with the set of initial and final configurations, the number of interior break-points (n−1) may be used as an input. Increasing n yields trajectories that are more flexible and smooth with possibly higher quality, but at the cost of more computation.

As will be described in further detail below, the exemplary optimization algorithm provides various features in generating the optimization solution. The global-planning task may be formulated as a decomposable optimization problem. The resulting sub-problems may be solved exactly and efficiently despite non-convexity and exemplary optimization algorithm coordinate the solutions of the sub-problems using message-passing. As described above, the three-weight message-passing algorithm is easily parallelized, does not require parameter tuning, and has good scalability with p. Within the decomposable framework, different minimizations of sub-problems, defined as "minimizers," ensure the trajectories satisfy a separate criterion. The exemplary optimization algorithm is flexible and may consider different combinations of minimizers. A particularly crucial minimizer ensures that there are no inter-agent collisions. Other minimizers allow for finding trajectories for the agents with minimal total energy, avoiding static obstacles, and/or imposing dynamic constraints such as maximum/minimum agent velocity. The method may also be specialized to perform local planning by solving the problem of joint optimization in the velocity space.

The exemplary optimization algorithm may relate to a variety of different minimizers for the problem of multi-agent trajectory planning. Once a formulation for an unconstrained optimization without static obstacles, a formulation for unconstrained optimization with static obstacles, and a message-passing formulation has been defined, an agent-agent collision minimizer, an agent-obstacle collision minimizer, and a minimum energy and maximum (or minimum) velocity minimizer may be solved for the problem.

Figure 5B:
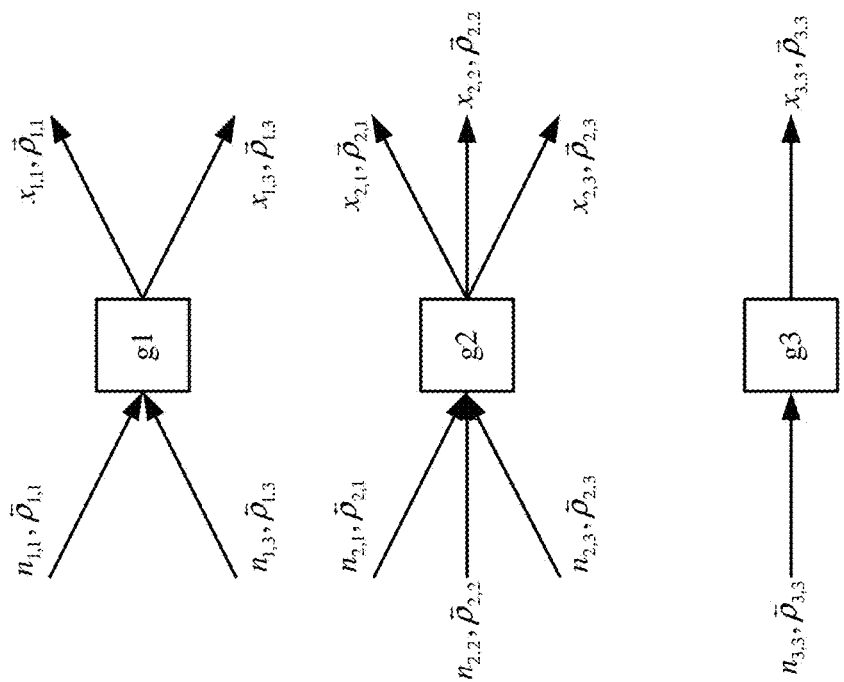
FIG. 5B shows input and output variables for each minimizer block of the graphical model of FIG. 5A according to an exemplary embodiment.
Figure 5A:
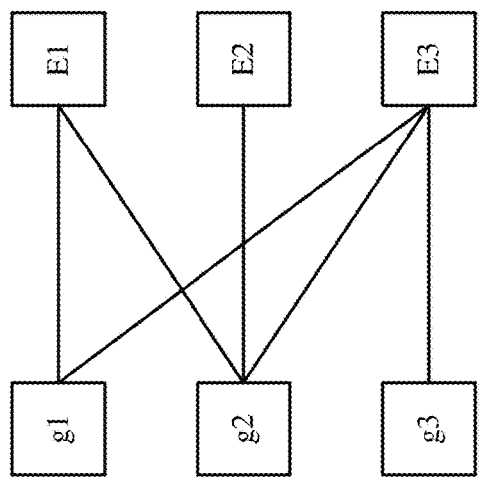
FIG. 5A shows a graphical model as applied to a multi-agent trajectory planning problem according to an exemplary embodiment.

FIG. 5A shows a small part of graphical model 500 as applied to a multi-agent trajectory planning problem according to an exemplary embodiment. FIG. 5B shows input and output variables (I/O) 550 for each minimizer block of the graphical model of FIG. 5A according to an exemplary embodiment. As illustrated, the graphical model 500 may be a bipartite graph with one minimizer-node (g1, g2, and g3) on the left for each function making up the overall objective function and one equality-node (E1, E2, and E3) on the right per variable in the problem. It is noted that most embodiments would typically have many more minimizer nodes on the left and equality nodes on the right (e.g. hundreds of nodes on each side); the exemplary embodiment in FIG. 5A only shows three on each side for illustrative purposes. The I/O variables 550 illustrate the input and output variables for each minimizer block g1, g2, and g3. Specifically, based upon the graphical model 500, the minimizer block g1 includes input variables $n_{1,1}$, $\vec{\rho}'_{1,1}$ and $n_{1,3}$, $\vec{\rho}'_{1,3}$ with output variables $x_{1,1}$, $\vec{\rho}_{1,1}$ and $x_{1,3}$, $\vec{\rho}_{1,3}$; the minimizer block g2 includes input variables $n_{2,1}$, $\vec{\rho}'_{2,1}$, $n_{2,2}$, $\vec{\rho}'_{2,2}$, and $n_{2,3}$, $\vec{\rho}'_{2,3}$ with output variables $x_{2,1}$, $\vec{\rho}_{2,1}$, $x_{2,2}$, $\vec{\rho}_{2,2}$, and $x_{2,3}$, $\vec{\rho}_{2,3}$; and the minimizer block g3 includes input variable $n_{3,3}$, $\vec{\rho}'_{3,3}$ with output variable $x_{3,3}$, $\vec{\rho}_{3,3}$.

The optimization problem for the multi-agent trajectory planning illustrated in FIG. 5A would be $\min_{x \in R^3} f(x) = \min_{\{x_1,x_2,x_3\}} f_1(x_1,x_3) + f_2(x_1,x_2,x_3) + f_3(x_3)$, where $f_i(.) \in R \cup \{+\infty\}$. The functions may represent soft costs or hard equality or inequality constraints. The three-weight message-passing algorithm may be used to solve this optimization problem iteratively by passing messages on the bipartite graph of graphical model 500 in which one minimizer node is represented per function $f_b$, one equality node is represented per variable $x_j$ and an edge (b,j), connecting b and j, if $f_b$ depends on $x_j$.

The way that minimizer nodes solve sub-problems and coordinate for robot trajectory optimization is similar to the description already made for circle packing. The minimizer node g1 may solve a small optimization problem over its local variables $x_1$ and $x_3$. The estimates $x_{1,1}$ and $x_{1,3}$ may then combine with running sums of the differences between the minimizer estimates and the equality-node consensus estimates to obtain messages $m_{1,1}$ and $m_{1,3}$ on each neighboring edge that are sent to the neighboring equality-nodes along with corresponding certainty weights $\vec{\rho}_{1,1}$ and $\vec{\rho}_{1,3}$. All other minimizers (e.g., g2 and g3) may also be solved accordingly.

The equality nodes E1, E2, and E3 may then receive these local messages and weights and produce consensus estimates for all variables by computing an average of the incoming messages, weighted by the incoming certainty weights $\vec{\rho}$. From these consensus estimates, correcting messages may be computed and communicated back to the minimizers to help them reach a consensus. A certainty weight for the correcting messages $\vec{\rho}'$ may also be communicated back to the minimizers. For example, the minimizer g1 may receive correcting messages $n_{1,1}$ and $n_{1,3}$ with corresponding certainty weights $\vec{\rho}'_{1,1}$ and $\vec{\rho}'_{1,3}$.

As in the previous description of the three-weight message-passing optimization algorithm applied to circle packing, when producing new local estimates, the bth minimizer node may compute its local estimates $\{x_j\}$ by choosing a point that minimizes the sum of the local function $f_b$ and weighted squared distance from the incoming messages where ties are broken randomly with the following:

$$\{x_{b,j}\}_j = g_b(\{n_{b,j}\}_j, \{\vec{\rho}^{\,k}_{b,j}\}_j) \equiv \operatorname*{argmin}_{\{x_j\}_j}\left[f_b(\{x_j\}_j) + \frac{1}{2}\sum_j \vec{\rho}_{b,j}(x_j - n_{b,j})^2\right]$$ (Equation A)

where $\{\ \}_j$ and $\Sigma_j$ run over all equality nodes connected to b. In the three-weight message-passing algorithm, the certainty weights $\{\vec{\rho}_{b,j}\}$ that this minimizer outputs must be 0 (uncertain); ∞ (certain); or $\rho_0$, set to some fixed weight. The logic for setting weights from minimizer nodes depends on the problem and with trajectory planning problems, only 0 or $\rho_0$ weights may be used. The zero weight of the three-weight message-passing algorithm enables equality nodes to ignore inactive constraints and traverse the search space much faster. It is again noted that all minimizers may operate simultaneously and the same is true for the consensus calculation performed by each equality node, thereby being easy to parallelize.

To begin the decomposition specific to the global trajectory planning optimization problem, the variables to be defined in the optimization problem are defined. The variables are defined as positions $\{x_i(s)\}_{i \in [p]}$ where the trajectories are indexed by i and break-points are indexed by a discrete variable s taking values between 1 and n−1. Accordingly, the points of the trajectories are not tracked by a continuous-time variable taking values in [0,T]. It is noted that $\{x_i(0)\}_{i \in [p]}$ and $\{x_i(n)\}_{i \in [p]}$ are the initial and final configuration, sets of fixed values, not variables to optimize. That is, these values are received as an initial input for the optimization problem and are not altered during the computation.

In a first optimization, a formulation for unconstrained optimization without static obstacles may be computed. In terms of these variables the non-collision constraints may be defined as:

$$\|(\alpha x_i(s+1)+(1-\alpha)x_i(s))-(\alpha x_j(s+1)+(1-\alpha)x_j(s))\| \geq r_i + r_j$$ (Equation B)

for all $i,j \in [p], s \in \{0, \ldots, m-1\}$ and $\alpha \in [0,1]$. The parameter α is used to trace out the constant-velocity trajectories of agents i and j between break-points s+1 and s. The parameter s has no units and is a normalized time rather than an absolute time. If $t_1$ is the absolute time of the break-point with integer index s and $t_2$ is the absolute time of the break-point with integer index s+1 and t parameterizes the trajectories in absolute time, then $\alpha = (t-t_1)/(t_2-t_1)$. It is noted that in the above formulation, absolute time does not appear and any solution is simply a set of paths that, when traveled by each agent at constant velocity between break-points, leads to no collisions. When converting this solution into trajectories parameterized by absolute time, the break-points do not need to be chosen uniformly spaced in absolute time.

The constraints represented in Equation B may be formally incorporated into an unconstrained optimization problem with the following form:

$$\min_{\{x_i(s)\}_{i,s}} f^{cost}(\{x_i(s)\}_{i,s}) + \quad \text{(Equation C)}$$

$$\sum_{s=0}^{n-1} \sum_{i>j} f^{coll}_{r_i,r_j}(x_i(s), x_i(s+1), x_j(s), x_j(s+1))$$

where $\{x_i(0)\}_p$ and $\{x_i(n)\}_p$ are constants rather than optimization variables and where the function $f^{cost}$ is a function that represents some cost to be minimized (e.g., the integrated kinetic energy or the maximum velocity over all the agents) and the function $f_{r,r'}^{coll}$ is defined as:

$$f_{r,r'}^{coll}(\underline{x},\overline{x},\underline{x}',\overline{x}') = J(\|\alpha(\overline{x}-\overline{x}') + (1-\alpha)(\underline{x}-\underline{x}')\| \geq r+r' \forall \alpha \in [0,1]) \quad \text{(Equation D)}$$

In this section, $\underline{x}$ and $\overline{x}$ represent the position of an arbitrary agent of radius r at two consecutive break-points and $\underline{x}'$ and $\overline{x}'$ represent the position of a second arbitrary agent of radius r' at the same break-points. The expression J(.) equals 0 whenever its argument, a clause, is true and takes equals $+\infty$ otherwise. Therefore, an infinite cost is paid in $f_{r,r'}^{coll}$ whenever there is a collision and zero is paid otherwise.

In Equation C, the cost function $f^{cost}(.)$ may be used to enforce a preference for trajectories satisfying specific properties. For example, there may be a preference for trajectories for which the total kinetic energy spent by the set of agents is small. Accordingly, the cost function may be defined as $f_C^{cost}(\underline{x},\overline{x}) = C\|\underline{x}-\overline{x}\|^2$ to result in the following:

$$f^{cost}(\{x_i(s)\}_{i,s}) = \frac{1}{pn}\sum_{i=1}^{p}\sum_{s=0}^{n-1} f_{C_{i,s}}^{cost}(x_i(s), x_i(s+1)) \quad \text{(Equation E)}$$

where the coefficients $\{C_{i,s}\}$ account for agents with different masses, different absolute-time intervals between break-points, or different preferences regarding which agents are to be less active and which agents are allowed to move faster.

To further simplify the computation, trajectories in which agents move faster than a certain amount may be excluded but without distinguishing among all remaining trajectories. Accordingly, the following may be used:

$$f_C^{cost}(\underline{x},\overline{x}) + J(\|\overline{x}-\underline{x}\| \leq C) \quad \text{(Equation F)}$$

In this case, associating each break-point to a time instant, the coefficients $\{C_{i,s}\}$ in Equation E may represent different limits on the velocity of different agents between different sections of the trajectory. If all agents are to be forced to have a minimum velocity, the inequality of Equation F may be reversed.

In a second optimization, a formulation for unconstrained optimization with static obstacles may be computed. In many scenarios, agents should also avoid collisions with static obstacles. Given two points in space $x_L$ and $x_R$, the optimization problem may include parameters to forbid all agents from crossing a line segment from $x_L$ to $x_R$ by adding the following term to Equation C: $\sum_{i=1}^{p}\sum_{s=0}^{n-1} f_{x_L,x_R,r_i}^{wall}(x_i(s), x_i(s+1))$. Since $r_i$ is the radius of agent i, the following may be used:

$$f_{x_L,x_R,r'}^{wall}(\underline{x},\overline{x}) = J\|(\alpha\overline{x}+(1-\alpha)\underline{x}) - (\beta x_R + (1-\beta)x_L)\| \geq r \quad \text{(Equation G)}$$

for all $\alpha,\beta \in [0,1]$. It is noted that $f^{coll}$ may be expressed using $f^{wall}$. Specifically, the following may result:

$$f_{r,r'}^{coll}(\underline{x},\overline{x},\underline{x}',\overline{x}') = f_{0,0,r+r'}^{wall}(\underline{x}'-\underline{x},\overline{x}'-\overline{x}) \quad \text{(Equation H)}$$

This modification may be used subsequently to express the minimizer associated with agent-agent collisions using the minimizer associated with agent-obstacle collisions, as will be described in further detail below.

When agents move in a plane (e.g., $x_i(s) \in R^2$ for all $s+1 \in [n+1]$), being able to avoid collisions with a general static line segment allows to automatically avoid collisions with multiple static obstacles of arbitrary polygonal shape. However, for simplicity, the numerical experiments only consider agents in the plane and so, only the minimizer block for wall collision for a 2-dimensional world is described. However, those skilled in the art will understand that the computations described herein may also be modified to incorporate higher dimensions.

In a third optimization, a formulation for message-passing may be computed. To solve Equation C using the three-weight message-passing algorithm, the topology of the bipartite graphical model 500 associated with the unconstrained Equation C is specified and the operation performed by every minimizer (i.e., the $\vec{\rho}$ weight update logic and the x variable update equations). It is noted that the choice of initial message values and weights and internal parameters are also included and will be described in further detail below.

To be concrete, the cost function is assumed to have the form of Equation E. The unconstrained Equation C then indicates that the global objective function is the sum of np(p+1)/2 terms: np(p−1)/2 functions $f^{coll}$ and np functions $f_C^{coll}$. These functions involve a total of (n+1)p variables out of which only (n−1)p are free (since the initial and final configurations are fixed). Correspondingly, the graphical model 500 along which messages are passed has np(p+1)/2 minimizer nodes (left side of graphical model 500) that connect to the (n+1)p equality nodes (right side of graphical model 500). Specifically, the equality node associated with the break-point variable $x_i(s), n > s > 0$ is connected to 2(p−1) different $g^{coll}$ minimizer nodes and two different $g_C^{cost}$ minimizer nodes. If s=0 or s=n, the equality node only connects to half as many $g^{coll}$ nodes and $g_C^{cost}$ nodes.

The following provides a description of the different minimizers g1, g2, and g3. Specifically, the minimizers include an agent-agent collision minimizer, an agent-obstacle collision minimizer, and a minimum energy and maximum (minimum) velocity minimizer. It is noted that every minimizer is a special case of Equation A.

In a first minimizer, the agent-agent collision minimizer may be a minimizer associated with the functions $f^{coll}$ that may be denoted by $g^{coll}$. This minimizer receives as parameters the radius r and r' of the two agents whose collision it is avoiding. The minimizer takes as input a set of incoming n messages $\{\underline{n},\overline{n},\underline{n}',\overline{n}'\}$ and associated $\vec{\rho}$ weights, $\{\vec{\rho},\vec{\rho},\vec{\rho},\vec{\rho}\}$. The minimizer outputs a set of updated x variables according to the following:

$$g^{coll}\left(\underline{n},\overline{n},\underline{n}',\overline{n}',\vec{\rho},\vec{\rho},\vec{\rho},\vec{\rho},r,r'\right) = \quad \text{(Equation I)}$$

-continued $$\operatorname*{argmin}_{\{x,\bar{x},\underline{x}',\bar{x}'\}} f_{r,r'}^{coll}(\underline{x}, \bar{x}, \underline{x}', \bar{x}') + \frac{\overleftarrow{\rho}}{2}\|\underline{x} - \underline{n}\|^2 +$$

$$\frac{\overleftarrow{\bar{\rho}}}{2}\|\bar{x} - \bar{n}\|^2 + \frac{\overleftarrow{\rho'}}{2}\|\underline{x}' - \underline{n}'\|^2 + \frac{\overleftarrow{\bar{\rho}'}}{2}\|\bar{x}' - \bar{n}'\|^2$$

Messages $\underline{n}$ and $\bar{n}$ come from the two equality nodes associated with the positions of one of the agents at two consecutive break points and $\underline{n}'$ and $\bar{n}'$ from the corresponding equality nodes for the other agent.

The update logic for the weights $\vec{\rho}$ for this minimizer may be determined with the following. If the trajectory from $\underline{n}$ to $\bar{n}$ for an agent of radius r does not collide with the trajectory from $\underline{n}'$ to $\bar{n}'$ for an agent of radius r', then all the outgoing weights $\vec{\rho}$ may be set to zero. Otherwise, the outgoing weights $\vec{\rho}$ may be set to $\rho^0$. The outgoing zero weights indicate to the receiving equality nodes in the graphical model 500 that the collision constraint for this pair of agents is inactive and that the values it receives from this minimizer node should be ignored when computing the consensus values of the receiving equality nodes.

In a second minimizer, the agent-obstacle collision minimizer may be the minimizer for the function $f^{wall}$ that may be denoted as $g^{wall}$. This minimizer may be parameterized by the obstacle position $\{x_L, x_R\}$ as well as the radius of the agent that needs to avoid the obstacle. This minimizer may receive two n messages $\{\underline{n}, \bar{n}\}$ and corresponding weights $\{\overleftarrow{\rho}, \overleftarrow{\bar{\rho}}\}$ from the equality nodes associated with two consecutive positions of an agent that needs to avoid the obstacle. The minimizer may output the x-variables as defined by the following:

$$g^{wall}(\underline{n}, \bar{n}, r, x_L, x_R, \overleftarrow{\rho}, \overleftarrow{\bar{\rho}}) = \qquad \text{(Equation J)}$$

$$\operatorname*{argmin}_{\{x,\bar{x}\}} f_{x_L,x_R,r}^{wall}(\underline{x}, \bar{x}) + \frac{\overleftarrow{\rho}}{2}\|\underline{x} - \underline{n}\|^2 + \frac{\overleftarrow{\bar{\rho}}}{2}\|\bar{x} - \bar{n}\|^2$$

When agents move in the plane (as discussed above, a two-dimensional plane), this minimizer may be solved by reformulating the optimization in Equation 10 as a mechanical problem involving a system of springs that are solved exactly and efficiently.

The update logic for the $\vec{\rho}$ weights is similar to that of the $g^{coll}$ minimizer. Specifically, if an agent of radius r going from $\underline{n}$ and $\bar{n}$ does not collide with the line segment from $x_L$ to $x_R$, then all outgoing weights may be set to zero because the constraint is inactive. Otherwise, all the outgoing weights $\vec{\rho}$ may be set to $\rho_0$. It is noted that from Equation H, the agent-agent minimizer $g^{coll}$ may be expressed using $g^{wall}$. Specifically, the following may result:

$$g^{coll}(\underline{n},\bar{n},\underline{n}',\bar{n}', \overleftarrow{\rho}, \overleftarrow{\bar{\rho}}, \overleftarrow{\rho'}, \overleftarrow{\bar{\rho}'}, r, r') = M_2 g^{wall}(M_1 \cdot \{\underline{n},\bar{n},\underline{n}',\bar{n}', \overleftarrow{\rho}, \overleftarrow{\bar{\rho}}, \overleftarrow{\rho'}, \overleftarrow{\bar{\rho}'}, r, r'\})$$

for a constant rectangular matrix $M_1$ and a matrix $M_2$ that depend on $\{\underline{n},\bar{n},\underline{n}',\bar{n}', \overleftarrow{\rho}, \overleftarrow{\bar{\rho}}, \overleftarrow{\rho'}, \overleftarrow{\bar{\rho}'}\}$.

In a third minimizer, the minimum energy and maximum velocity (or minimum velocity) minimizer may be the minimizer may be associated with the functions $f^{cost}$ that is denoted by $g^{cost}$ and receives as input, two n messages $\{\underline{n},$ $\bar{n}\}$ and corresponding weights $\{\overleftarrow{\rho}, \overleftarrow{\bar{\rho}}\}$ when $f^{cost}$ is decomposed as in Equation E. The messages may come from two equality nodes associated with two consecutive positions of an agent. The minimizer may also be parameterized by a cost factor c. Accordingly, this minimizer may output a set of updated x messages defined with the following:

$$g^{cost}(\underline{n},\bar{n},\overleftarrow{\rho},\overleftarrow{\bar{\rho}},c) = \qquad \text{(Equation K)}$$

$$\operatorname*{argmin}_{\{x,\bar{x}\}} f_c^{cost}(\underline{x}, \bar{x}) + \frac{\overleftarrow{\rho}}{2}\|\underline{x} - \underline{n}\|^2 + \frac{\overleftarrow{\bar{\rho}}}{2}\|\bar{x} - \bar{n}\|^2$$

The update logic for the $\vec{\rho}$ weights of the minimum energy minimizer may always set all outgoing weights $\vec{\rho}$ to $\rho_0$. For the update logic of the $\vec{\rho}$ weights of the maximum velocity minimizer, the following rule may be used: if $\|\underline{n}-\bar{n}\| \le c$, then all outgoing weights may be set to zero, while otherwise, the outgoing weights may be set to $\rho_0$. For the update logic of the $\vec{\rho}$ weights of the minimum velocity minimizer, the following rule may be used: if $\|\underline{n}-\bar{n}\| \ge c$, then all the outgoing weights may be set to zero, while otherwise, the outgoing weights may be set to $\rho_0$.

The following description provides how the exemplary optimization algorithm in which a three-weight message-passing algorithm used with the ADMM algorithm is configured to generate an optimization solution for local trajectory planning based on velocity obstacles. Given the current position $\{x_i(0)\}_{i \in [p]}$ and radius $\{r_i\}$ of all agents that are velocity obstacles, a new velocity command may be computed jointly for all agents minimizing the distance to their preferred velocity $\{v_i^{ref}\}_{i \in [p]}$. This new velocity command is used to guarantee that the trajectories of all agents remain collision free for at least a time horizon $\tau$. New collision free velocities are computed every $\alpha\tau$ seconds where $\alpha < 1$ until all agents reach their final configuration. Assuming an obstacle-free environment and first order dynamics, the collision-free velocities may be given by $$\operatorname*{minimize}_{\{v_i\}_{i \in [p]}} \sum_{i \in [p]} C_i \|v_i - v_i^{ref}\|^2 \text{ s.t.}$$

$$\|(x_i(0) + v_i t) - (x_j(0) + v_j t)\| \ge r_i + r_j \forall \ i \in [p], t \in [0, \tau]$$

Since the velocities $\{v_i\}_{i \in [p]}$ are related linearly to the final position of each object after $\tau$ seconds, a simple change of variables as $\{x_i(\tau)\}_{i \in [p]}$ enables the above problem to be reformulated as the following:

$$\operatorname*{minimize}_{\{v_i\}_{i \in [p]}} \sum_{i \in [p]} C_i' \|x_i - x_i^{ref}\|^2 \text{ s.t.} \qquad \text{(Equation L)}$$

$$\|(1-\alpha)(x_i(0) - x_j(0)) + \alpha(x_i, x_j)\| \ge r_i + r_j \forall \ j > i \in [p],$$

$$\alpha[0,1]$$

where $C_i' = C_i/\tau^2$, $x_i^{ref} = x_i(0) + v_i^{ref}\tau$ and the $\tau$ in $x_i(\tau)$ is dropped. This may be extended to account for collisions with the static line segments $\{x_{Rk}, x_{Lk}\}_k$, thereby formulating an unconstrained form using the functions $f^{cost}$, $f^{coll}$, and $f^{wall}$ the following:

$$\min_{\{x_i\}_i} \sum_{i \in [p]} f_{C_i}^{cost}(x_i, x_i^{ref}) + \sum_{i > j} f_{r_i, r_j}^{coll}(x_i(0), x_i, x_j(0), x_j) + \qquad \text{(Equation M)}$$
$$\sum_{i \in [p]} \sum_k f_{x_{Rk}, x_{Lk}, r_i}^{wall}(x_i(0), x_i)$$

It is noted that $\{x_i(0)\}_i$ and $\{x_i^{ref}\}_i$ are constants, not variables being optimized.

Given this formulation, the three-weight message-passing algorithm may be used to solve the optimization problem. All corresponding minimizers are special cases of minimizers derived in the manner discussed above for global trajectory planning. Experimental testing has shown that using the exemplary optimization algorithm provides improvements to conventional manners such as a Mixed Integer Quadratic Programming (MIQP) approach. Specifically, the time for convergence (e.g., when there is a consensus) to determine the optimization solution for the problem is improved for each number of agents p as well as for when the number of agents p increases. Once the optimization solution has been determined, a signal may be generated based upon the optimization solution and transmitted to the agents.

The exemplary optimization algorithm provides a manner in which global and local planning of the trajectory of multiple distinct agents may be determined. The optimization solution to be determined is based on solving a non-convex optimization problem using a modified ADMM algorithm in which a three-weight message-passing algorithm is incorporated. The optimization algorithm may flexibly account for obstacles and different cost functions. For agents in a plane or space, explicit expressions that account for static obstacles, moving obstacles, and dynamic constraints on the velocity and energy may be derived such as in the manner described above.

Figure 6:
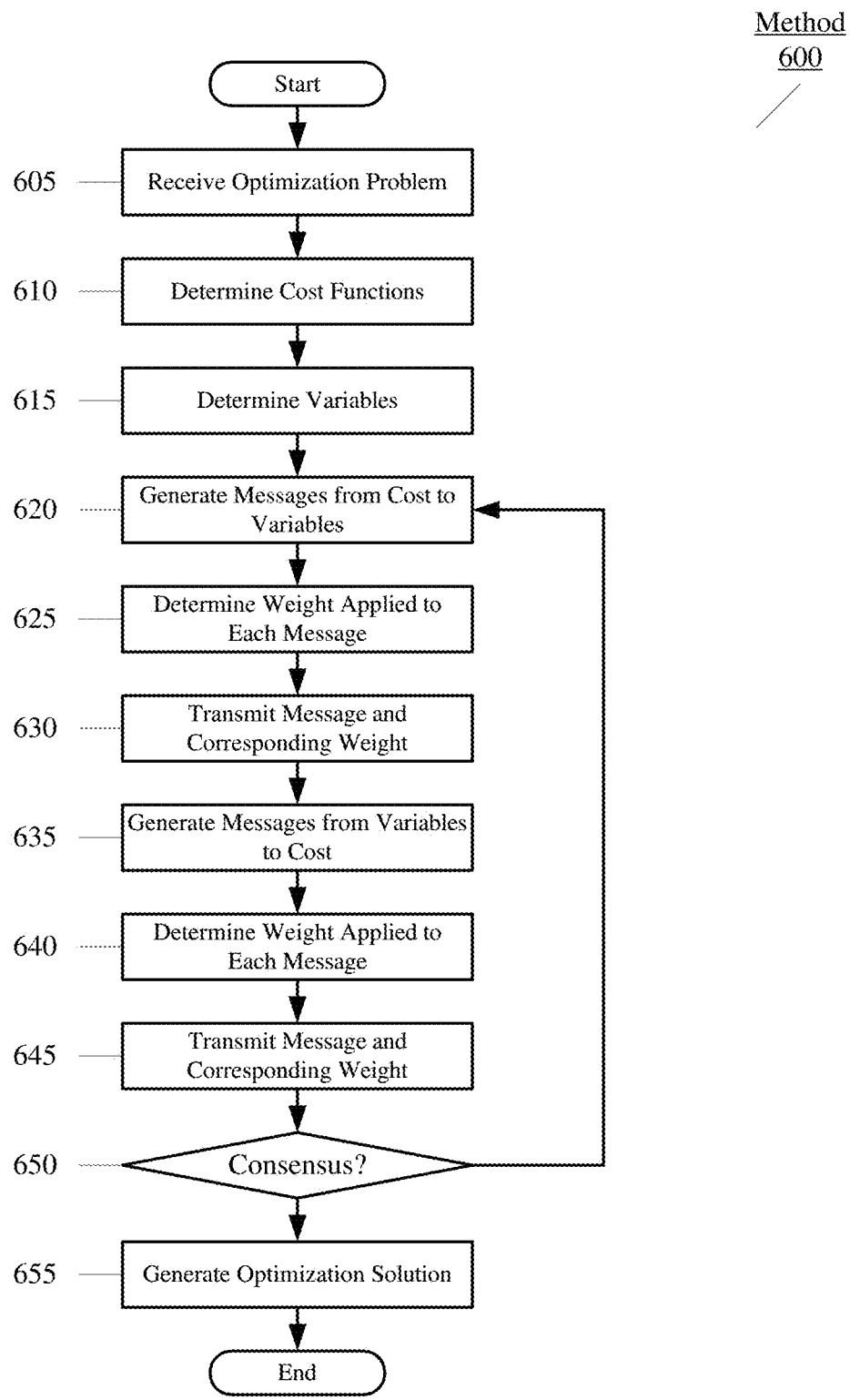
FIG. 6 shows a method of generating an optimization solution according to an exemplary embodiment.

FIG. 6 shows a method 600 of generating an optimization solution according to an exemplary embodiment. In step 605, the device 100 receives the optimization problem. For example, via the I/O device 120, a user may provide the optimization problem. Within the optimization problem are a plurality of cost functions and a plurality of variables or constraints. Thus, in step 610 and 615, the device 100 (via the variable engine 125 and the cost engine 130) determine the cost functions and the variables of the optimization problem. It should be noted that the user may simply provide the cost functions and the variables. Thus, the device 100 may receive the cost functions and the variables.

It should be noted that the device 100 may utilize a factor graph such as the graphical models 200, 500. Thus, the method 600 may include steps that generate these factor graphs. For example, the factor graph engine 135 may generate the graphical models via the constraint engine 140 providing data as to the relationships between the cost functions and the variables. Specifically, the relationships may be those shown in the graphical models 200, 500 for the nodes on the left and the nodes on the right.

In step 620, the device 100 generates messages to be passed from the cost functions to the variables (e.g., the messages to be passed from the left nodes to the right nodes on the factor graph). In step 625, the device 100 also determine a respective weight to be applied to each message. As discussed above, the exemplary optimization algorithm utilizes a three-weight message-passing algorithm. Accordingly, each message that is generated also includes a corresponding weight of zero, infinite, and standard. In step 630, the message and corresponding weight are transmitted from the cost functions to the variables.

In step 635, based upon the messages and weights that were received from the cost functions to the variables, the device 100 generates further messages to be passed from the variables to the cost functions. In step 640, the device 100 determines a respective weight to be applied to each of these further messages. In step 645, the further message and corresponding weight are transmitted from the variables to the cost functions.

In step 650, the device determines whether there is a consensus between the messages being transmitted between the cost functions and the variables. If a consensus has not been reached, the method 600 returns to step 620 where steps 620-645 are repeated. This may repeat as many times as required for the consensus to be reached. Once the consensus is reached, the method 600 continues to step 655. In step 655, the optimization solution is generated as a function of the messages transmitted that were determined to form the consensus. That is, the optimization solution relates to a minimum being reached for each of the cost functions while still satisfying all the requirements of the variables.

It should be noted that the method 600 may include further steps. For example, the method 600 may include a criterion in which the consensus is only formed when a predetermined number of consecutive messages that are passed between the cost functions and the variables holds true. Thus, after step 650, the method 600 may include a further determination such that the satisfaction of the predetermined number is determined. In another example, the method 600 may include steps after step 625 and step 640 in which a determination is made whether nodes or input/outputs to the nodes may be ignored or removed from further computation. For example, when a zero weight or infinite weight is determined for a particular message, the graphical model may be modified to incorporate this knowledge to further improve efficiency in determining the optimization solution.

The above description is of the ADMM algorithm of messages being passed in a message-passing algorithm including various weights associated with each of the messages to resolve an optimization solution in a more efficient manner. For example, a complete trajectory path may be determined using the above described process. The above description is directed to generating the complete trajectory path using individual tracklets that are determined that when combined creates the complete trajectory path. The above description relates to the tracklets being determined as straight line tracklets. That is, each tracklet represents a straight line and the complete trajectory path is a series of straight line tracklets.

In a further exemplary manner of resolving the optimization problem utilizing the above described process, the tracklets may be determined as curved tracklets. That is, the tracklets used to determine the complete trajectory path may be determined as splines. As those skilled in the art will readily understand, a spline is a numeric function defined by polynomial functions in a piecewise manner. A curve associated with the spline has a high degree of smoothness at locations where the polynomial pieces connect. Therefore, in this further exemplary embodiment, the ADMM algorithm using the three-weight algorithm may obtain a solution to an optimization problem such as obtaining collision-avoiding trajectories. With particular regard to the trajectory optimization problem involving robots, the exemplary embodiments herein refer to the algorithm as a Spline-based ADMM for Robot Trajectory Avoidance (SPARTA). As will be described in further detail below, the problem of solving for collision-avoiding trajectories for robots into tractable problems may also use the framework of the ADMM and the three-weight algorithm. The generated paths may be smooth, include physical constraints of the robots, and a convergence speed may be such that feasibility for real-time applications may be achieved. More specifically, the three-weight algorithm may be used by breaking an optimization problem of solving for collision-avoiding trajectories of robots or vehicles into a plurality of tractable sub-problems and combining the solutions of these sub-problems into an overall solution using the three-weight ADMM algorithm. As noted above, a feature in the solution is a representation of the tracklets as connected splines that lead to a much smoother solution than those based on connected straight-line segments.

It should again be noted that the following relates to an optimization problem and solution related to determining a trajectory, particularly involving one or more robots being moved along the determined trajectory. However, this is only exemplary and the exemplary embodiments may be modified and adapted for use with any optimization problem involving any type and/or number of variables and inputs as well as environments. In a first example, the optimization problem may relate to a robot given a target initial and final position to find a good choreographed trajectory such as used in animation to animate a crowd scene. In a second example, the optimization problem may relate to humans continuously directing a respective vehicle with a goal of respecting the human's requested directions as much as possible while avoiding collisions such as used in free-ranging vehicles in theme parks.

It is also noted that the SPARTA algorithm described herein may include similarities with select features of the above described straight line tracklet optimization process. However, these similarities in the SPARTA algorithm are provided again herein for clarity, for continuity, and to emphasize a departure as the process involving a determination of splines requires different computations and considerations.

The optimization problem of determining smooth collision-avoiding paths for a set of moving objects arises in many different settings (e.g., robot trajectory planning, swarm robotics, self-driving vehicles, etc.). There have been many different approaches to determine a solution to such optimization problems including rapidly-exploring random trees (RRTs) and formulations of constrained non-linear optimization problems. However, these approaches may be fast but have difficulty when the starting guess for the algorithm involves large violations of the constraints. Those skilled in the art will understand that robust methods are required to be both capable of dealing with initial conditions that are rooted within the infeasible region and able to refine a feasible solution to obtain smooth final results.

As described in detail above, one such approach to determining a solution to the optimization problem is the ADMM approach including the three-weight algorithm. The three-weight ADMM algorithm considers the optimization problem where the function $f$ that is being minimized is a sum of simple functions denoted as factors:

$$\underset{z_1,\ldots,z_N}{\text{minimize}} f(z_1,\ldots,z_N) = \sum_\alpha f_\alpha(\{z_k\}_\alpha)$$

subject to $g_{\alpha'}(\{z_k\}_{\alpha'}) \leq 0$ where $z=\{z_1, \ldots, z_n\}$, $\{z_k\}_\alpha$ are the variables on which the factor $f_\alpha$ depends, $g_{\alpha'}$ are the constraints, and $\{z_k\}_{\alpha'}$ are the variables that factor $g_{\alpha'}$ depends on. In one manner, each function $f_\alpha$ depends on a small subset of variables. The constraints may be treated as factors: add a function $f_\alpha = \infty \times I(-g_\alpha(z))$ that is infinity if $g_\alpha(z)>0$, zero otherwise ($I(x)=0$ if $x>0$, 1 otherwise). The factors and mathematical details related thereto will be described in further detail below.

Unlike approaches that incrementally move downhill, the three-weight ADMM algorithm approach combines solutions to sub-problems with a guarantee that whenever the algorithm converges, all hard constraints are satisfied. The ADMM algorithm typically converges faster when the problem is broken down into relatively large sub-problems that are each solved efficiently. The three-weight algorithm builds the analog of active set methods into ADMM. That is, if a hard constraint is inactive (i.e., the messages it receives are in the feasible set), it sends a zero-weight message to speed up the process of convergence. This results in a change to the performance of the ADMM algorithm on problems such as circle packing from a slow rate to a significantly increased rate. For the three-weight ADMM algorithm of the exemplary embodiments utilizing splines, an efficient convergence may be achieved for optimization problems both small and large.

As noted above, with the above described exemplary embodiment in which the tracklets (e.g., solutions to the sub-problems) solved to create the complete optimization solution are straight lines, the three-weight ADMM algorithm may encounter limitations. For example, with a straight line, an acceleration is potentially infinite at every time step, which may be inapplicable to an actual scenario. Splines provide a different form of solution to the sub-problems in order to determine the solution to the optimization problem, as splines provide a smooth representation and a relatively low-dimensional parameter space to optimize. The exemplary embodiments address building the three-weight ADMM algorithm to optimization problems with splines as variables using SPARTA. Previous works relied on the sub-problems being solved in the ADMM algorithm to be exactly solvable. In the exemplary embodiments, such a restriction may be lifted as the sub-problems are amenable to standard optimization algorithms. As will be described in further detail below, the exemplary embodiments utilize Sequential Least Squares Quadratic Programming (SLSQP) as a sub-routine to solve the sub-problems in an efficient manner. As will also be described in further detail below, the exemplary embodiments are compared with the SLSQP applied to the entire optimization problem and illustrate the results that SPARTA achieves solving the optimization problem in a modular and robust manner.

Figure 7:
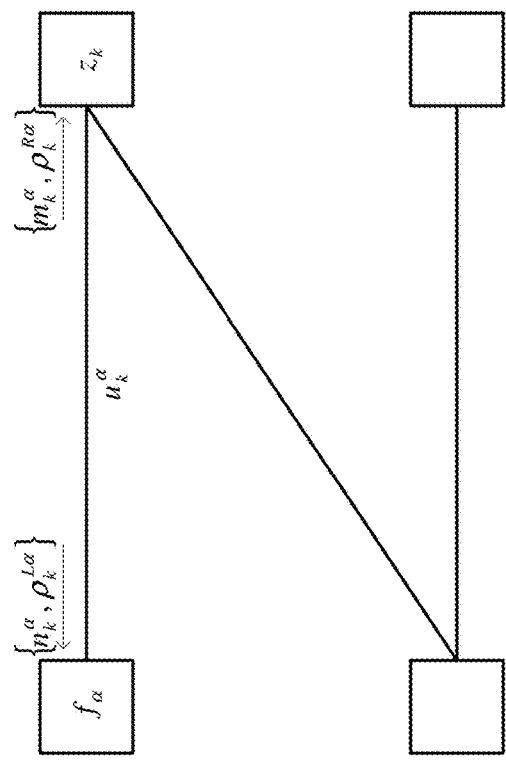
FIG. 7 shows a further pictorial representation of a three weight message passing according to an exemplary embodiment.

The three weight ADMM algorithm builds a distributed approach to the optimization problem. FIG. 7 shows a further pictorial representation 700 of a three-weight message passing according to an exemplary embodiment. The representation 700 may be substantially similar to the graphical model 200 of FIG. 2 and the graphical model 500 of FIG. 5. In the representation 700, the factors $f_\alpha$ are placed on the left and the variables $z_k$ are placed on the right. A line connecting each factor to each variable it depends on is drawn such that for each factor, local copies $x_k^\alpha$ of the variables it depends on, associated $u_k^\alpha$ variables, weight variables to the left $\rho_k^{L\alpha}$ ($\rho_k^{R\alpha}$ for the right), and messages to the left $n_k^\alpha$ ($m_k^\alpha$ for the right) are created.

To initialize, each variable $x_k^\alpha$ is set to a respective initial guess, each variable $n_k^\alpha$, $m_k^\alpha$, and $u_k^\alpha$ is set to zero, and all weights $\rho_k^{R\alpha}, \rho_k^{L\alpha}$ are set to zero. Subsequently, the following steps may loop until convergence. That is, the following steps may be performed until a solution to the optimization problem is determined. As discussed above, a substantially similar representation as illustrated in the graphical model 200 may be used relating to left side operations and right side operations.

First, the values for the variables may be updated on the left by finding a proximal optimum for each factor using the following:

$$x_k^\alpha \leftarrow \underset{x_k^\alpha}{\operatorname{argmin}}\left[f_\alpha(\{x_k^\alpha\}) + \sum_k \frac{\rho_k^{L\alpha}}{2}(x_k^\alpha - n_k^\alpha)^2\right]$$

Second, new values for the right-going weights $\rho_k^{R\alpha}$ may be computed depending on the logic of the minimizers. Third, the new right-going messages may be computed with the following:

$$m_k^\alpha \leftarrow x_k^\alpha + u_k^\alpha$$

Fourth, the new weighted average values of the variables on the right may be computed with the following:

$$z_k \leftarrow \frac{\sum_\alpha \rho_k^{R\alpha} m_k^\alpha}{\sum_\alpha \rho_k^{R\alpha}}$$

Fifth, the left-going weights may be computed with the following:

$$\rho_k^{L\alpha} \leftarrow \max_{k'} \rho_k^{R\alpha}$$

Sixth, the disagreement variables u on each edge may be updated with the following:

$$u_k^{60} \leftarrow u_k^\alpha + \beta(x_k^\alpha - z_k^\alpha)$$

Seventh, the new left-going messages may be computed with the following:

$$n_k^\alpha \leftarrow z_k^\alpha - u_k^\alpha$$

The above steps may be looped until convergence.

At each iteration, each factor receives its copy of the variables with associated weights. A sub-problem is solved independently of the other factors which involves minimizing its $f_\alpha$ plus a quadratic penalty for differing from the messages it received. Using the following:

$$x_k^\alpha \leftarrow \underset{x_k^\alpha}{\operatorname{argmin}}\left[f_\alpha(\{x_k^\alpha\}) + \sum_k \frac{\rho_k^{L\alpha}}{2}(x_k^\alpha - n_k^\alpha)^2\right],$$

a solution is sent out with weights to the right. Once the factors are done, the weighted messages on the right are averaged, with the average being sent to the left with an appropriate weight.

In conventional ADMM, all the weights are equal to a constant $\rho$. However, with the three-weight algorithm, the weights may be modified. If a factor enforcing a hard constraint (referred to herein as a "hard factor") is receiving messages in a feasible set with respect to its constraints, a zero-weight message is sent out to the right. This may result in an inactive constraint being stopped from slowing down the algorithm (e.g., the convergence process to determine the optimization solution). The weight to the left may be defined as $\rho_k^{L\alpha} = \max_\alpha \rho_k^{R\alpha}$: the variable is as informative as the most informative message associated with it. It is noted that in practice, for a zero weight, a small weight (e.g., $10^{-4}$) may be used. The factors enforcing a soft objective may send out constant weight messages with weight given by a fixed value $\rho$. With regard to the exemplary embodiments of SPARTA, with such factors, the following may always hold true: $\rho_k^{L\alpha} = \rho$.

In using SPARTA, the exemplary embodiments are described with a particular optimization problem. Specifically, the optimization problem may be defined by considering N spherical robots in a D-dimensional space, each with its own radius $R_a$, moving during a time interval $[0,T]$. The position of robot a at time t is $\vec{r}^a(t)$ and its velocity is $\dot{\vec{r}}^a(t)$. The optimization problem may include a specification of a desired path for each robot $r^{Da}(t)$. However, as noted above, the exemplary embodiments may be utilized for any optimization problem.

The exemplary embodiments using SPARTA seek to minimize the quadratic departure from the velocity of a desired path with the following:

$$f(\vec{r}_1, \vec{r}_2, \dots) = \gamma \cdot \sum_{a=1}^N \int_0^T \left(\dot{\vec{r}}^a(t) - \dot{\vec{r}}^{Da}(t)\right)^2 dt$$

where $\vec{r}_a$ is an entire path of robot a from $t=0$ to $t=T$. The robots are required not to collide during the motion, the first derivatives of the paths are to be continuous, the velocity is to stay below $v_{max}$, the acceleration is to stay below $a_{max}$, and an angular velocity is to stay below $\dot{\theta}_{max}$. All results described herein are in two dimensions (i.e., $D=2$). As angular velocity is not defined for greater than two dimensions, the description herein is restricted to two dimensions for clarity. However, it is noted that the exemplary embodiments may be utilized for any number of dimensions with particular use in three dimensions. The value of $\gamma$ may be a constant prefactor that does not affect a true global minimum. The prefactor $\gamma$ is set appropriately for SPARTA to converge by determining a value that works for $N=2$ robots and scaling $\gamma$ as $1/N$. An initial position of the robots may be fixed and a final position may be optionally selected. It is noted that SPARTA may incorporate other objectives especially since SLSQP is used as a sub-routine which those skilled in the art will understand is configured to handle non-linear objectives.

A desired path for the optimization problem may also be added where a final point is not set (otherwise the robots may stand still). When fixing initial and final positions, the position $\vec{r}_{Da}(t)=0$ may be set for an objective function. The position $\vec{r}_{Da}(t)$ may equivalently be set to be a straight line at constant velocity $\vec{v}^a$ from start point $\vec{S}$ to end point $\vec{E}$: $\dot{\vec{r}}^{Da}(t) = (\vec{E} - \vec{S})/T$. In this case, $\int_0^T \dot{\vec{r}}^a(t) \cdot \dot{\vec{r}}^{Da}(t) dt = (\vec{E} - \vec{S})^2/T$ holds true, therefore $\int_0^T (\dot{\vec{r}}^a(t) - \dot{\vec{r}}^{Da}(t))^2 dt = \int_0^T$ $\dot{\vec{r}}^a(t)^2 - (\vec{E}-\vec{S})^2/T$ also holds true and the objective may equivalently be viewed as $\gamma \Sigma_a \int_0^T \dot{\vec{r}}^a(t)^2 dt$.

The paths may be represented as a set of second order splines for which the first derivative is required to be continuous. There may be $n_t$ time points $t_i$ where i=1, . . . , $n_t$ and N robots labeled by a=1, . . . , N. Each robot's path may be made up of $n_t$−1 splines $\vec{P}_i^{\vec{y}a}(t)$ for $t \in [t_i, t_{i+1}]$ with i=1, . . . , $n_t$−1. Accordingly, the following may be used:

$$\vec{P}_i^{\vec{y}a}(t) = \vec{Y}_i^{Pa}(t_{i+1}-t)\delta t_i^{-1} + \vec{Y}_{i+1}^{Pa}(t-t_i)\delta t_i^{-1} + \vec{Y}_i^{Ca}(t-t_{i+1})(t-t_i)\delta t_i^{-2}$$

where $\delta t_i = t_{i+1} - t_i$ and $\vec{Y} = \vec{z}$ if the spline represents the spline on the right (i.e., the actual value output by SPARTA) or $\vec{Y} = \vec{x}_\alpha$ if the spline is the local copy of the variable associated with a factor on the left. The index $\alpha$ that labels the factor may be omitted in equations when the relevant factor is clear from context. The spline variables $\vec{Y}_i^{Sa} = \{\vec{Y}_i^{Pa}, \vec{Y}_i^{Ca}, \vec{Y}_{i+1}^{Pa}\}$ may be defined as vectors of all the variables that define the spline of robot a at time slice i. The time points $t_i$ may be set arbitrarily. In the description herein, equally spaced time points defined by $t_i = (i-1)*T/(n_t-1)$ may be used.

Each factor $\alpha$ may depend on a set of spline variables $\{\vec{z}_i^{Sa}\}$. Each factor may carry its own set of Lagrange multiplier variables $\{\vec{u}_{\alpha i}^{Sa}\}$, message variables $\{\vec{n}_{\alpha i}^{Sa}\}$, and output variables $\{\vec{x}_{\alpha i}^{Sa}\} + \{\vec{x}_{\alpha i}^{Pa}, \vec{x}_{\alpha i}^{Ca}, \vec{x}_{\alpha(i+1)}^{Pa}\}$. The label $\alpha$ may be omitted because context dictates which factor is being used. The label $\alpha$ is included herein to emphasize that each factor carries its own local copies of these variables. The variables $\{\vec{z}_i^{Sa}\}$ may be read off as a final solution to the optimization problem.

The following is a discussion of the factors used to solve the optimization problem according to the exemplary embodiments. For piecewise linear segments, the sub-problems of each factor are exactly solvable. For SPARTA, exact solutions may not be derived but SLSQP may be used for the factors that are not solved exactly.

In a first factor, collision avoidance may be considered. For each pair of robots a with radius $R_a$ and b with radius $R_b$ and each time interval $[t_i, t_{i+1}]$, the splines of the robots in that time interval are required to remain at a minimum distance $R_{ab} = R_a + R_b$ for all $t \in [t_i, t_{i+1}]$. The relevant factor must minimize the function $$\frac{\rho}{2}(\vec{x}_i^{Sa} - \vec{n}_i^{Sa})^2 + \frac{\rho}{2}(\vec{x}_i^{Sb} - \vec{n}_i^{Sb})^2$$

over $\vec{x}_i^{Sa}, \vec{x}_i^{Sb}$ subject to $\|\vec{P}_i^{\vec{x}a}(t) - \vec{P}_i^{\vec{x}b}(t)\| \geq R_{ab}$ for all $t \in [t_i, t_{i+1}]$. To formulate this semi-infinite program as a problem SLSQP is capable of solving, the function $t^*(\vec{x}_i^{Sa}, \vec{x}_i^{Sb})$ denotes the time in $[t_i, t_{i+1}]$ where $\|\vec{P}_i^{\vec{x}a}(t) - \vec{P}_i^{\vec{x}b}(t)\|$ is minimized, which depends on $\vec{x}_i^{Sa}, \vec{x}_i^{Sb}$. The program is then equivalent to the following which may be fed to SLSQP:

$$\min_{\vec{x}_i^{Sa}, \vec{x}_i^{Sb}} \frac{\rho}{2}(\vec{x}_i^{Sa} - \vec{n}_i^{Sa})^2 + \frac{\rho}{2}(\vec{x}_i^{Sb} - \vec{n}_i^{Sb})^2$$

-continued $$\text{s.t. } \left\|\vec{P}_i^{\vec{x}a}(t*(\vec{x}_i^{Sa}, \vec{x}_i^{Sb})) - \vec{P}_i^{\vec{x}b}(t*(\vec{x}_i^{Sa}, \vec{x}_i^{Sb}))\right\| \geq R_{ab}$$

If the splines corresponding to the incoming messages are the solution (i.e., the robots are non-colliding), then $\rho^R = 0$, otherwise $\rho^R = \rho$. SLSQP is started at $\vec{x}^{Sa} = \vec{n}^{Sa}, \vec{x}^{Sb} = \vec{n}^{Sb}$. It is noted that for fifty robots, these factors take approximately 30% of the total computation time of the problem.

With regard to computational details for the collision avoidance factor such as a spline overlap factor, translational invariance may be used to reduce the sub-problem to a 3D-dimensional problem, where D is the number of dimensions of the global problem. The center of mass (CM) and relative coordinates may be defined with the following:

$$\vec{Y}_{CM,i}^{Sa,b} = (\vec{Y}_i^{Sa} + \vec{Y}_i^{Sb})/2$$

$$\vec{Y}_{Rel,i}^{Sa,b} = \vec{Y}_i^{Sa} + \vec{Y}_i^{Sb}$$

where $\vec{Y} = \vec{x}$ or $\vec{n}$. Since $\vec{Y}_i^{Sa} = \{\vec{Y}_i^{Pa}, \vec{Y}_i^{Ca}, \vec{Y}_{i+1}^{Pa}\}$, the transformations $\vec{Y}_i^{Pa} = \vec{Y}_i^{Pa} - \vec{Y}_i^{Pb}$ and $\vec{Y}_i^{Ca} = \vec{Y}_i^{Ca} - \vec{Y}_i^{Cb}$ may be defined. The objective function in terms of the CM and the relative coordinates may be rewritten as the following:

$$\frac{\rho}{2}(\vec{x}_i^{Sa} - \vec{n}_i^{Sa})^2 + \frac{\rho}{2}(\vec{x}_i^{Sb} - \vec{n}_i^{Sb})^2 = \rho(\vec{x}_{CM,i}^{Sa,b} - \vec{n}_{CM,i}^{Sa,b})^2 + \frac{\rho}{4}(\vec{x}_{Rel,i}^{Sa,b} - \vec{n}_{Rel,i}^{Sa,b})^2$$

The constraint $\|P_i^{\vec{x}a}(t) - P_i^{\vec{x}b}(t)\| \geq R_a + R_b \forall t \in [t_i, t_{i+1}]$ depends on $\vec{x}_{Rel,i}^{Sa,b}$ and utilizes the following:

$$P_i^{\vec{x}a}(t) - P_i^{\vec{x}b}(t) = (\vec{x}_{rel,i}^{Pa,b}(t_{i+1} - t^*) + \vec{x}_{Rel,i+1}^{Pa,b}(t^* - t_i) + \vec{x}_{Rel,i}^{Ca,b}(t^* - t_i)(t^* - t_{i+1})\delta t_i^{-1})\delta t_i^{-1}$$

The solution of the above satisfies $\vec{x}_{CM,i}^{Sa,b} = \vec{n}_{CM,i}^{Sa,b}$ and SLSQP may be used to solve the following:

$$\underset{\vec{x}_{Rel,i}^{Sa,b}}{\text{minimize}} \frac{\rho}{4}(\vec{x}_{Rel,i}^{Sa,b} - \vec{n}_{Rel,i}^{Sa,b})^2$$

$$\text{subject to } \left\|P_i^{\vec{x}a}(t*(\vec{x}_{Rel,i}^{Sa,b})) - P_i^{\vec{x}b}(t*(\vec{x}_{Rel,i}^{Sa,b}))\right\| \geq R_a + R_b$$

where $t^*(\vec{x}_{Rel,i}^{Sa,b})$ is the time in $[t_i, t_{i+1}]$ at which $\|P_i^{\vec{x}a}(t) - P_i^{\vec{x}b}(t)\|$ is minimized.

In a second factor, a soft objective may be considered. The soft objective factors exist for each robot a and time interval $[t_i, t_{i+1}]$. The soft objective factors must minimize the function over $$\frac{\rho}{2}(\vec{x}_i^{Sa} - \vec{n}_i^{Sa})^2 + \gamma \int_{t_i}^{t_{i+1}} \left(\dot{\vec{P}}_i^{\vec{x}a}(t) - \dot{\vec{r}}^{Da}(t)\right)^2 dt$$

over $\vec{x}_i^{Sa} = \{\vec{x}_i^{Pa}, \vec{x}_i^{Ca}, \vec{x}_{i+1}^{Pa}\}$ which is a quadratic form whose minimum is found by solving a linear set of equations (e.g., using standard methods). If the spline is at t=1 and the initial position is set, or if the spline is at t=N−1 and the final position is set, then the variable does not exist in the optimization problem and is set to a correct value with no associated penalty cost.

With regard to computational details for the soft objective factor, the optimization sub-problem for the factor associated with the soft objective may be defined as:

$$\underset{\vec{x}_i^{Sa}}{\text{minimize}} \frac{\rho}{2}(\vec{x}_i^{Sa} - \vec{n}_i^{Sa})^2 + \gamma \int_{t_i}^{t_{i+1}} \left(\dot{\vec{P}}_i^{\vec{x}a}(t) - \dot{\vec{r}}^{Da}(t)\right)^2 dt$$

There are two versions of this sub-problem: one has no constraints on the beginning and endpoints while the other does. For the splines of the first time interval, $\vec{P}_1^{\vec{x}a}$ may be fixed to be the robot starting point and for the splines of the last time interval, $\vec{P}_N^{\vec{x}a}$ may be set to the end point (if it is set). The function to minimize is a quadratic function of $\vec{x}_i^{Pa}$, $\vec{x}_i^{Ca}$, and $\vec{x}_{i+1}^{Pa}$ which may be minimized quickly by solving a set of linear equations. Each dimension is independent so D three-dimensional linear problems result. Calling $\vec{v}_j = \{(\vec{x}_i^{Pa})_j, (\vec{x}_i^{Ca})_j, (\vec{x}_{i+1}^{Pa})_j\}$ where j indexes a dimension, the objective may be written as a sum of quadratic forms $$\frac{1}{2}\sum_{jkk'} A_{jkk'}(\vec{v}_j)_k (\vec{v}_j)_{k'} + \frac{\rho}{2}((\vec{v}_j)_k - (\vec{n}_j)_k)^2$$

where $\vec{n}_j \times \{(\vec{n}_i^{Pa})_j, (\vec{n}_i^{Ca})_j, (\vec{n}_{i+1}^{Pa})_j\}$. For each j independently, $\vec{v}_j$ is found by taking the derivative and setting it to zero, resulting in the equation $(\Sigma_{kk'} A_{jkk'} + \rho \delta_{kk'})(\vec{v}_j)_k = \rho(\vec{n}_j)_k$ to be solved. Since $A_{jkk'} + \rho \delta_{kk'}$ is constant, it may be lower upper (LU) decomposed once to make the linear solve very fast. If starting points or end points are set, the variables are frozen and the same technique may still be used with the appropriate lower dimensional $A_{jkk'}$.

In a third factor, continuous first derivatives may be considered. The continuous first derivative factors exist for each robot and time point between splines. The continuous first derivative factors minimize the function $$\frac{\rho}{2}(\vec{x}_i^{Sa} - \vec{n}_i^{Sa})^2 + \frac{\rho}{2}(\vec{x}_{i+1}^{Sa} - \vec{n}_{i+1}^{Sa})^2$$

subject to $\dot{\vec{P}}_i^{\vec{x}a}(t_{i+1}) = \dot{\vec{P}}_{i+1}^{\vec{x}a}(t_{i+1})$. Each dimension decouples. This computation may be solved exactly by writing it in the following form: minimizing $$\frac{\rho}{2}\sum (\vec{v}_i - n_i)^2$$

subject to $\Sigma_i \mu_i \vec{v}_i = 0$ where $\vec{v} = \{\vec{x}_i^{Pa}, \vec{x}_i^{Ca}, \vec{x}_{i+1}^{Pa}, \vec{x}_{i+1}^{Ca}, \vec{x}_{i+2}^{Pa}\}$. Using a Lagrange multiplier, the following function is determined:

$$\vec{v}_i = \vec{n}_i - \rho^{-1} \frac{\sum_j \mu_j \vec{n}_j}{\sum_j \rho_j^{-1} \mu_j^2} \mu_i.$$

The output weights may be $\rho^R = \rho$.

With regard to computational details for the continuous first derivatives factor such as a derivative continuity factor, for all robots a, for all time steps except the last one i<N, the final solution must satisfy the following function $\dot{\vec{P}}_i^{\vec{z}a}(t_{i+1}) = \dot{\vec{P}}_{i+1}^{\vec{z}a}(t_{i+1})$. Thus factors are added to solve the following sub-problem:

$$\underset{\vec{x}_i^{Sa}, \vec{x}_{i+1}^{Sa}}{\text{minimize}} \frac{\rho}{2}(\vec{x}_i^{Sa} - \vec{n}_i^{Sa})^2 + \frac{\rho}{2}(\vec{x}_{i+1}^{Sa} - \vec{n}_{i+1}^{Sa})^2$$

subject to $\dot{\vec{P}}_i^{\vec{x}a}(t_{i+1}) = \dot{\vec{P}}_{i+1}^{\vec{x}a}(t_{i+1})$ This problem may be solved exactly. Each dimension D is independent so that there are D 5-dimensional problems in the form:

$$\underset{\vec{v}}{\text{minimize}} \frac{\rho}{2}\sum_j (\vec{v}_j - \vec{n}_j)^2 \text{ subject to}$$

$$\sum_j \mu_j \vec{v}_j = 0$$

where $\{\vec{v}_1, \vec{v}_2, \vec{v}_3, \vec{v}_4, \vec{v}_5\} = \{\vec{x}_i^{Pa}, \vec{x}_i^{Ca}, \vec{x}_{i+1}^{Pa}, \vec{x}_{i+1}^{Ca}, \vec{x}_{i+2}^{Pa}\}$ and $\{\mu_1, \mu_2, \mu_3, \mu_4, \mu_5\} = \{-\delta t_i^{-1}, \delta t_i^{-1}, \delta t_i^{-1} + \delta t_{i+1}^{-1}, \delta t_{i+1}^{-1}\}$ where $\delta t_1 = t_{i+1} - t_i, \delta t_{i+1} = t_{i+2} - t_{i+1}$. It is noted that each $\vec{v}_j$ is a vector while each $\mu_j$ is a scalar. Using Lagrange multipliers, the solution may be determined with the following:

$$\vec{v}_j = \vec{n}_j - \frac{\mu_j}{\sum_k \mu_k^2} \sum_{k'} \mu_{k'} \vec{n}_{k'}$$

In a fourth factor, line obstacles may be considered. The line obstacle factor may be described with a line segment extending from $\vec{v}_1$ to $\vec{v}_2$. The line obstacle factor must minimize the function $$\frac{\rho}{2}(\vec{x}_i^{Sa} - \vec{n}_i^{Sa})^2$$

subject to $\forall t \in [t_i, t_{i+1}], \forall \alpha \in [0,1]: \|\vec{P}_i^a(t) - (\alpha \vec{v}_2 + (1-\alpha)\vec{v}_1)\| \geq R_a$ for robot a at time slice i. The point of closest overlap between the spline and the line segment may be determined to turn the semi-infinite program into a program with one constraint. The constraint may be the point of closest approach between the spline and the line segment being at least a distance $R_a$ apart, which is solved with SLSQP.

With regard to computational details for the line obstacle factor such as a line segment obstacle factor, a line segment noted above extending from $\vec{v}_1$ to $\vec{v}_2$ may again be considered. Initially, a determination is made whether the spline is overlapping with the line segment where any overlap point is obviously the point of closest approach. If there is an overlap, the spline is first translated so that it no longer overlaps with the line segment, otherwise SLSQP is incapable of moving out of the overlap since for any small motion of the spline the minimum distance will still be 0 and the linearization of the constraint which is inherent in SLSQP would be 0. If the spline and line segment are not overlapping, the time at which they are closest to each other is determined and the distance at that time is required to be greater than or equal to $R_a$. If the spline and line segment are not overlapping, several cases must be considered; the closest point on the spline could be either internal or an endpoint and a similar analysis is necessary for the line segment.

In a fifth factor, maximum velocity may be considered. The velocity depends linearly on time in a spline. Therefore, to enforce a maximum velocity $\vec{P}_i^{\vec{x}a}(t)$, the maximum velocity need only be enforced at the endpoints $t_i$. For $t_i$, the function $$\frac{\rho}{2}(\vec{x}_i^{Sa} - \vec{n}_i^{Sa})^2$$

must be minimized subject to $\|\dot{\vec{P}}_i^{\vec{x}a}(t_i)\|^2 \leq v_{max}^2$. If the messages satisfy the constraint, the result $\vec{x}_i^{Sa} = \vec{n}_i^{Sa}$ and $\rho^R = 0$ may be output. Otherwise, the constraint becomes active with $\|\dot{\vec{P}}_i^{\vec{x}a}(t_i)\|^2 = v_{max}^2$ and $\rho^R = \rho$. A quadratic objective with a quadratic constraint may be solved exactly.

With regard to computational details for the maximum velocity factor, as noted above, this sub-problem has a quadratic function with a quadratic constraint. Specifically, it is of the form:

$$\underset{\vec{x}}{\text{minimize}} \frac{\rho}{2}(\vec{x} - \vec{n})^2 \text{ s.t. } (\vec{\mu}_i\vec{x}_i)^2 = C^2$$

where the constraint is assumed to be active and C is a constant. By introducing a Lagrange multiplier $\lambda$, the following function $$\frac{\rho}{2}(\vec{x} - \vec{n})^2 + \lambda((\vec{\mu}_i\vec{x}_i)^2 - C^2)$$

is to be minimized resulting in the following:

$$\vec{x} = \vec{n} - 2\lambda\rho^{-1}(\vec{\mu} \cdot \vec{x})\vec{\mu} \quad \text{(Equation AB-1)}$$

Taking the inner product with $\mu$ on both sides and rearranging, the following results:

$$\vec{\mu} \cdot \vec{x}(1 + 2\lambda\rho^{-1}\vec{\mu}^2) = \vec{\mu} \cdot \vec{n} \quad \text{(Equation AB-2)}$$

It is evident that $\vec{\mu} \cdot \vec{x}$ is proportional to $\vec{\mu} \cdot \vec{n}$ implying $\vec{\mu} \cdot \vec{x} = (C/\|\vec{\mu} \cdot \vec{n}\|)\vec{\mu} \cdot \vec{n}$ since the constraint is active. From this and Equation AB-2, the result $(1 + 2\lambda\rho^{-1}\vec{\mu}^2) = \|\vec{\mu} \cdot \vec{n}\|/C$ is found which defines $\lambda$ and therefore the solution through Equation AB-1.

In a sixth factor, maximum acceleration may be considered. The maximum acceleration factor $a_{max}$ may be enforced by imposing $$\|\vec{x}_i^{Ca}\| \leq a_{max}\frac{\delta t_i^2}{2}$$

since $\ddot{\vec{P}}_i^{\vec{x}a}(t) = 2\vec{x}_i^{Ca}/\delta t_i^2$ holds true. The maximum acceleration factor must minimize the function $$\frac{\rho}{2}(\vec{x}_i^{Ca} - \vec{n}_i^{Ca})^2$$

subject to $\|\vec{x}_i^{Ca}\| \leq \lambda$ where $$\lambda = a_{max}\frac{\delta t_i^2}{2}.$$

If the incoming message is feasible $$\left(\text{i.e., } \|\vec{n}_i^{Ca}\| \leq a_{max}\frac{\delta t_i^2}{2}\right),$$

then $\vec{x}_i^{Ca} = \vec{n}_i^{Ca}$ and $\rho^R = 0$ holds true for all variables. Otherwise $\vec{x}_i^{Ca} = \vec{n}_i^{Ca}\lambda/\|\vec{n}_i^{Ca}\|$ and $\rho^R = \rho$ holds true for all variables.

In a seventh factor, maximum angular velocity may be considered. The maximum angular velocity factor may be solved with SLSQP. As noted above, the angular velocity $\dot{\theta}$ is only defined in two dimensions (i.e., D=2) (although generalizations exist in higher dimensions). Given a path (x(t),y(t)), the angular velocity is equal to $$\dot{\theta}(t) = \frac{\dot{x}\ddot{y} - \ddot{x}\dot{y}}{\dot{x}^2 + \dot{y}^2}.$$

In this case, the x and y coordinates are $(\vec{x}_i^{Pa})_1, (\vec{x}_i^{Pa})_2$, respectively. This sub-problem may be formulated as minimizing $$\frac{\rho}{2}(\vec{x}_i^{Sa} - \vec{n}_i^{Sa})^2$$

subject to the maximum angular velocity factor being less than or equal to $\dot{\theta}_{max}$. Therefore, the $t^*(\vec{x}_i^{Pa})$ in $[t_i, t_{i+1}]$ that maximizes $\|\dot{\theta}(t)\|$ is to be determined. The numerator $(\dot{\vec{P}}_i^{\vec{x}a}(t))_1(\ddot{\vec{P}}_i^{\vec{x}a}(t))_2 - (\ddot{\vec{P}}_i^{\vec{x}a}(t))_1(\dot{\vec{P}}_i^{\vec{x}a}(t))_2$ is independent of time in this case and the denominator is $(\dot{\vec{P}}_i^{\vec{x}a}(t))^2$. Therefore, only the function $(\dot{\vec{P}}_i^{\vec{x}a}(t))^2$ need be minimized, which is a quadratic function of t, in the range $[t_i, t_{i+1}]$.

FIGS. 8A-D show a set of conditions and solutions of an optimization problem according to an exemplary embodiment. Specifically, FIG. 8A shows an actual solution 805 for an optimization problem as determined through the exemplary embodiments described herein with SPARTA and utilizing splines as the solutions to the sub-problems in the three-weight ADMM algorithm; FIG. 8B shows a condition 810 defining an optimization problem; FIG. 8C shows a solution 815 for the optimization problem 810 having no line obstacles; and FIG. 8D shows a solution 820 for the optimization problem 810 having line obstacles.

The actual solution 805 illustrated in FIG. 8A may relate to an optimization problem for two robots of different radii with fixed initial and final positions and no physical constraints giving intuition regarding the solution for more robots. The robots first move in a straight line until a tangential contact and then rotate around each other and finally go in a straight line again. The solution is therefore continuous with discontinuous second derivative at the two time points.

Figures 9A, 9B, 9C:
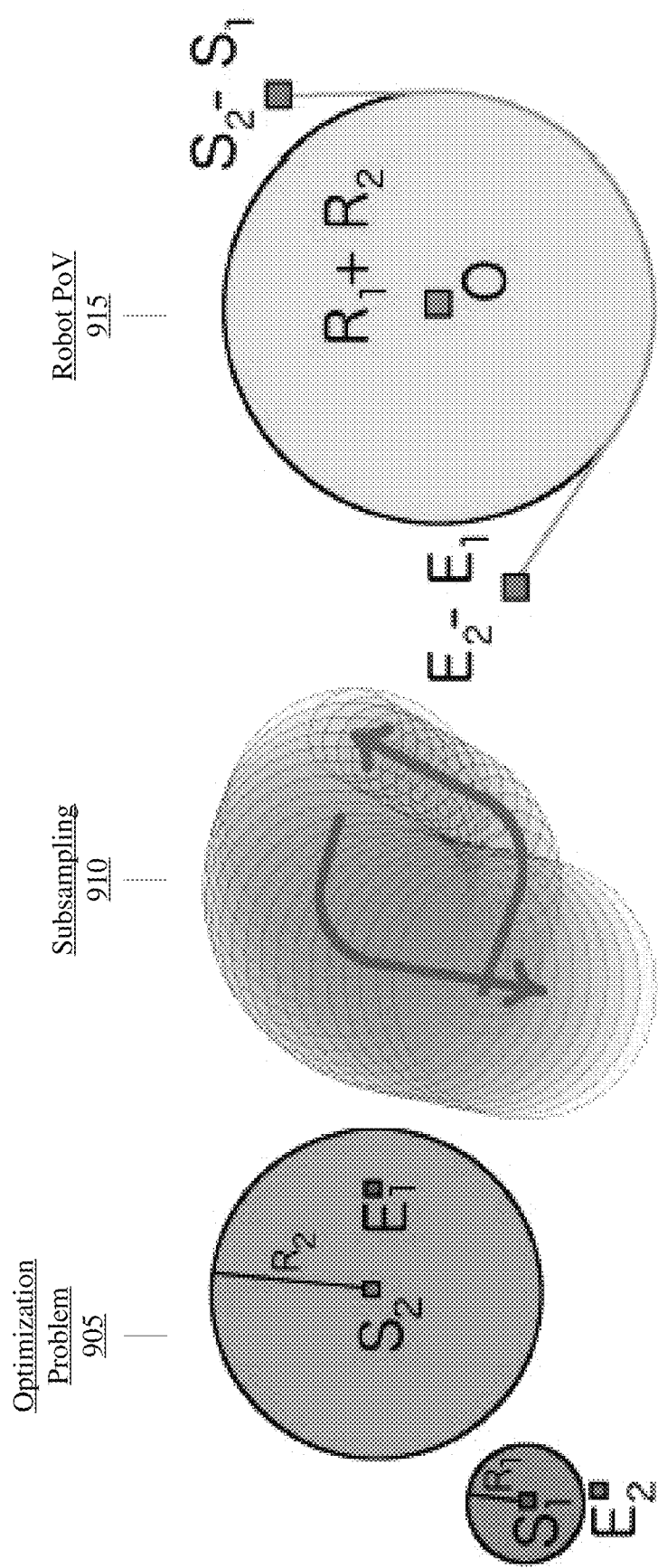
FIGS. 9A-C show a precise description of generating the optimization solution according to an exemplary embodiment.

FIGS. 9A-C show a precise description of generating the optimization solution according to an exemplary embodiment. Specifically, FIGS. 9A-C relate to the above noted actual solution 805 of a two robot problem. As shown in FIG. 9A, the optimization problem 905 is defined. Specifically, a first robot 1 of radius $R_1$ must start at $\vec{S}_1$ and end at $\vec{E}_1$ while a second robot 2 of radius $R_2$ starts at $\vec{S}_2$ and ends at $\vec{E}_2$. The robots 1, 2 must not collide at any time and must minimize the function $$\frac{\gamma}{2}\left(\int_o^T (\dot{\vec{r}}_1(t) + \dot{\vec{r}}_2(t))^2 dt\right)$$

where $\vec{r}_i(0)$ is the position of robot a at time t. FIG. 9B shows a sub-sampling 910 of the exact solution 805. FIG. 9C shows a robot point of view (PoV) 915 for the optimization problem in the reference frame of robot 1.

The above optimization problem may be solved exactly by minimizing the following function:

$$\frac{\gamma}{2}\int_0^T (\dot{\vec{r}}_1(t) + \dot{\vec{r}}_2(t))^2 dt$$

where $\vec{r}_i(0)$ is the position of robot a at time t and $\|\vec{r}_1(t) - \vec{r}_2(t)\| \geq R_1 + R_2 \forall t \in [0,T]$. The center of mass (CM) and relative coordinates (Rel) such that $f = f_{CM} + f_{Rel}$ may be determined with the following:

$$f_{CM} = \frac{\gamma}{2}\int_0^T (\dot{\vec{r}}_1(t) + \dot{\vec{r}}_2(t))^2 dt$$

and $$f_{Rel} = \frac{\gamma}{2}\int_0^T (\dot{\vec{r}}_1(t) - \dot{\vec{r}}_2(t))^2 dt$$

The first term is minimized by having the CM move in a straight line with the following:

$$\vec{r}_1(t) + \vec{r}_2(t) = \vec{S}_1 + \vec{S}_2 + \frac{t}{T}(\vec{E}_1 + \vec{E}_2 - \vec{S}_1 - \vec{S}_2)$$

which contributes the following:

$$f_{CM} = \frac{1}{2T}(\vec{E}_1 + \vec{E}_2 - \vec{S}_1 - \vec{S}_2)^2$$

Robot 2 starts at $\vec{S}_2 - \vec{S}_1$ and ends at $\vec{E}_2 - \vec{E}_1$ with reference to robot 1 and must be at least a distance $R = R_1 + R_2$ away from the origin O. The fastest path first goes straight, hits the circle of radius R tangentially, moves along the circle's perimeter until a straight path is available to $\vec{E}_2 - \vec{E}_1$ and then takes that straight path. The first straight line has length $L_1 = \sqrt{(\vec{S}_2 - \vec{S}_1)^2 - R^2}$, the circular segment has length $$L_2 = R\left(\arccos\left(\frac{(\vec{S}_2 - \vec{S}_1)\cdot(\vec{E}_2 - \vec{E}_1)}{\|(\vec{E}_2 - \vec{E}_1)\|\|(\vec{S}_2 - \vec{S}_1)\|}\right) - \arccos\left(\frac{R}{\|\vec{S}_2 - \vec{S}_1\|}\right) - \arccos\left(\frac{R}{\|\vec{E}_2 - \vec{E}_1\|}\right)\right),$$

and the second straight line has length $L_3 = \sqrt{(\vec{E}_2 - \vec{E}_1)^2 - R^2}$. Moving at constant velocity, the relative coordinates contribute the following:

$$f_{Rel} = \frac{1}{2T}(L_1 + L_2 + L_3)^2$$

To obtain a lower bound on a problem such as optimization problem 810, the object function derived above may be added for all pairs of robots on antipodal points of the circle exchanging places (as discussed below). Because this is the minimum of an objective function that has positive terms removed (interaction terms between circles not on antipodal points), it is a lower bound on any finite value of the full objective function.

The condition 810 illustrated in FIG. 8B may represent an initial condition for an optimization problem. Specifically, there may be N robots (N=50 in this case) starting in a circle pattern of a circle of radius $R_s$ with each robot having a radius $r = 2\pi/(4N)$. The maximum velocity may be set to $v_{max} = 10R_s/s$; the maximum acceleration may be set to $a_{max} = 10R_s/s^2$; and the maximum angular velocity may be set to $\dot{\theta}_{max} = 10$ rad/s. Each path may be made up of three splines and they must end at the antipodal point on the circle (i.e., end point). The condition 810 may also include a rectangle 810a and a triangle 810b. The solution 815 found using SPARTA for 50 robots with no line obstacles may be found in approximately 1.1 seconds using a computing device including four cores. Fifty sampled points are shown from each continuous path. The solution 820 found using SPARTA for 50 robots with seven line obstacles (e.g., four line obstacles forming the rectangle 810a and three line obstacles forming the triangle 810b and disposed within the circle of radius $R_s$) may be found in approximately 4.4 seconds using a computing device including four cores. The solutions 815, 820 also illustrate how SPARTA, through using splines, finds smooth and tight solutions.

FIGS. 10A-D show a set of comparisons for generating the optimization solution according to an exemplary embodiment. Specifically, the set of comparisons relate to utilizing SPARTA and SLSQP for the optimization problem of N robots starting in a circle and having to move to the antipodal point. As shown in the comparisons, SPARTA finds lower objective solutions more quickly. As the number of robots increases, SLSQP increasingly does not find a solution. In most cases, when SLSQP gets stuck, the paths have points where some pairs of robots get very close to each other, and it is incapable of resolving this. SPARTA always converged for these problems while also being trivial to parallelize.

Figures 10A, 10B, 10C, 10D:
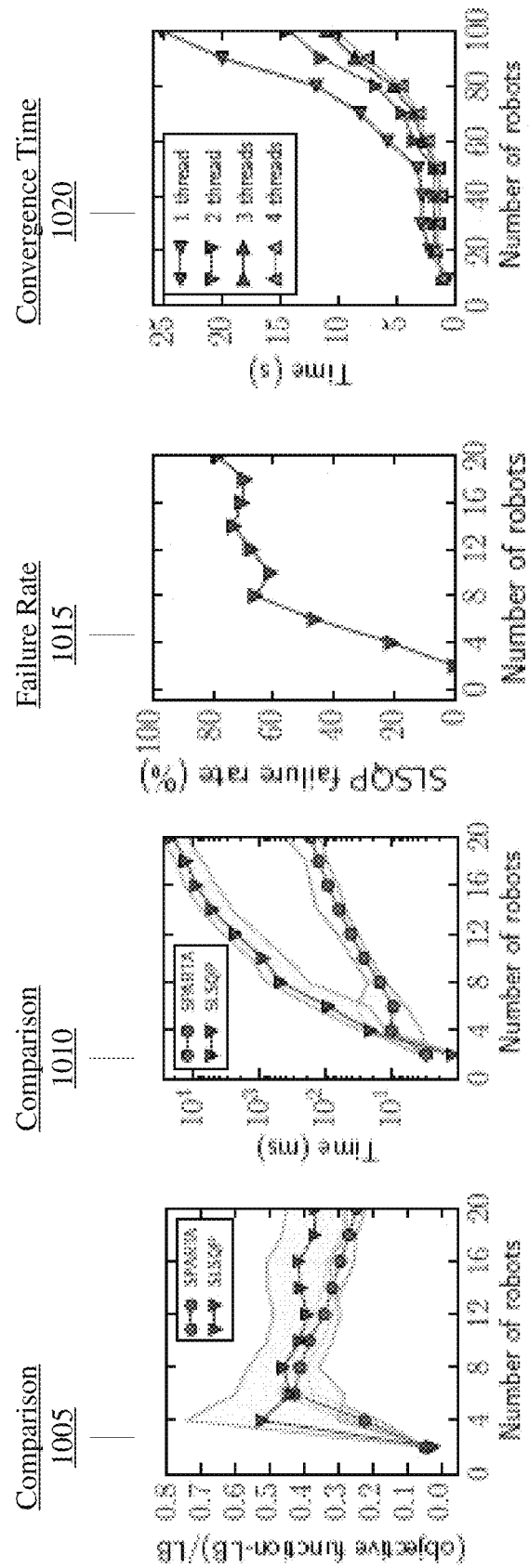
FIGS. 10A-D show a set of comparisons for generating the optimization solution according to an exemplary embodiment.

FIGS. 10A-B show comparisons 1005, 1010, respectively of SPARTA to SLSQP applied to the whole problem with the same conditions as described above. Each configuration is sent to SPARTA thirty times initializing the paths to straight lines from start to end point, adding a random number in [−0.05,0.05] to each variable. The step size is set to β=0.3. In the comparisons 1005, 1010, the mean is plotted and the lines one standard deviation away are also plotted. As illustrated in the comparison 1005, the objective function is shown. As illustrated in the comparison 1010, the convergence time is shown. The comparisons 1005, 1010 may be directed to a comparison to a lower bound to the objective function obtained by exactly solving the problem where only robots starting on antipodal points interact (e.g., as discussed above with reference to the actual solution 805). The three-weight ADMM algorithm using splines according to SPARTA is run until all variables do not change by more than $10^{-3}$.

FIG. 10C shows a failure rate 1015 of the SLSQP as a fraction of times a convergence is not found as a function of the number of robots. As shown, with an increasing number of robots, the number of instances for which the SLSQP process does not provide a solution (through convergence) increases. In contrast, SPARTA always converged in identical experiments. FIG. 10D shows a convergence time 1020 as a function of the number of threads for a representative run for each number of robots.

Figure 11C:
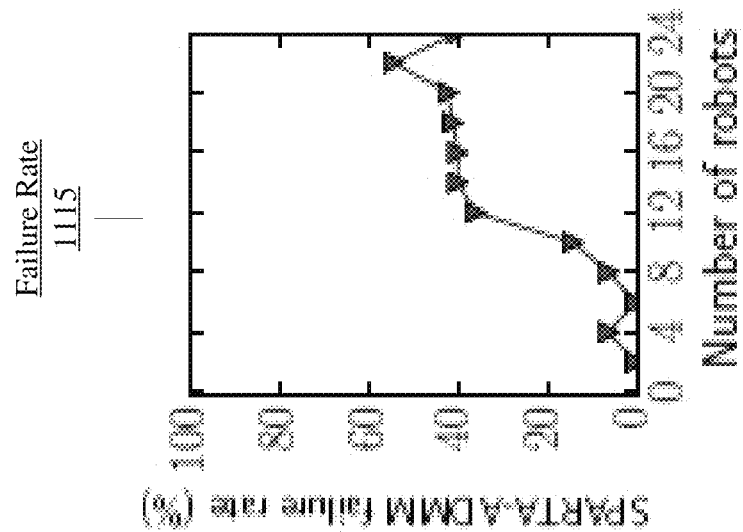
FIGS. 11A-C show a further set of comparisons for generating the optimization solution according to an exemplary embodiment.
Figure 11B:
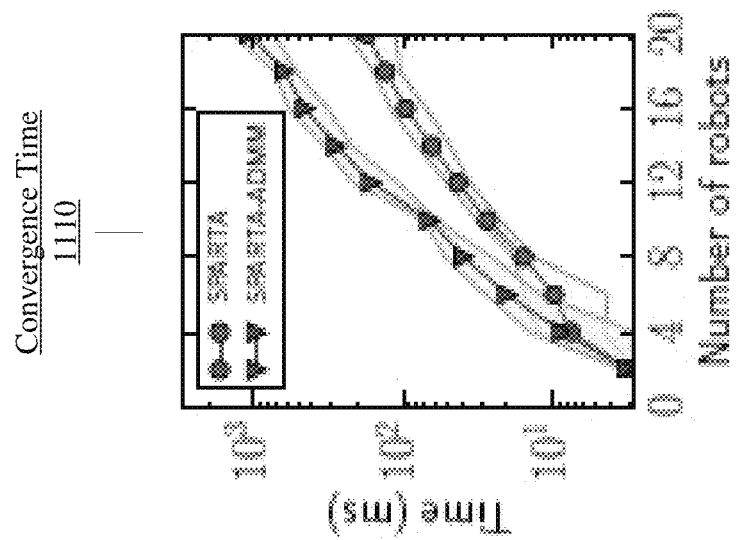
Figure 11A:
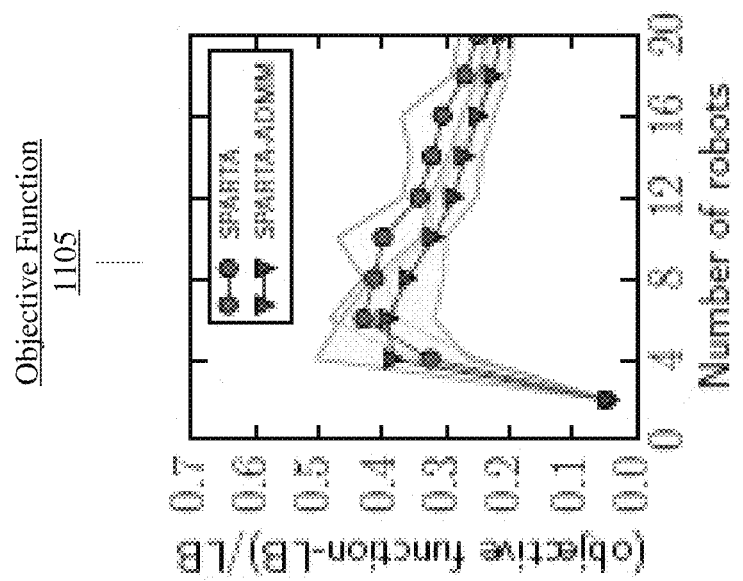

To further illustrate the results of the above described exemplary embodiments, the effects of having non-uniform weights may be analyzed by comparing SPARTA to SPARTA-ADMM, an embodiment of SPARTA where all weights are equal. FIGS. 11A-C show a further set of comparisons for generating the optimization solution according to an exemplary embodiment in which this comparison is analyzed. The set of comparisons shows that SPARTA-ADMM finds slightly lower objective function. However, SPARTA-ADMM is slower and suffers a substantially similar problem as SLSQP of failing to converge with a probability that grows with the number of robots. Specifically, FIG. 11A shows an objective function comparison 1105 when SPARTA-ADMM has equal weights; FIG. 11B shows a convergence time comparison 1110 when SPARTA-ADMM has equal weights; and FIG. 11C shows a failure rate 1115 of the SPARTA-ADMM that has equal weights.

In testing the real-time capacity of SPARTA, a plurality of two-wheeled mobile robots were utilized in experiments. In FIGS. 12A-D show an application of generating the optimization solution according to an exemplary embodiment. Specifically, FIGS. 12A-D shows an implementation of SPARTA on mobile robots. A camera tracks the positions of the robots by overlooking the robots and tracking each robot using clustering from which position and orientation are derived. Users define a desired velocity and angular velocity of the robots which gives a predicted path given to SPARTA as an initial point and a set of desired trajectories $r^{Da}(t)$. SPARTA outputs paths satisfying no-collision and physical constraints which are fed to a controller of the robot motors.

FIG. 12A shows a solution execution 1205 in which four robots are in the midst of executing a robot exchange. FIG. 12B shows a set of determined trajectories 1210 of measured paths for the robots during the exchange of the solution execution 1205. FIG. 12C shows a bounding area 1215 of a virtual bounding zone for eight mobile robots. A line is added at edges to prevent SPARTA from producing paths ending in a corner. FIG. 12D shows a solution execution 1220 in which eight robots are given a full throttle. SPARTA is run without fixed final points but with $\vec{r}^{Da}(t)$ equal to a linear path starting at the current position and moving straight with the maximum velocity. After continuous running of the robots (e.g., 10 minutes), SPARTA results in trajectories such that the robots never collided or left the bounding region.

Given a position and a desired path, a controller may transmit controls to the wheels of the robot to follow the path (e.g., via the transceiver 115). This controller may follow the path to within a predetermined error margin that is incorporated in the effective robot radius for purposes of SPARTA. The system may be run in two modes: setting a desired final trajectory or responding to user inputs in real-time. The first case is described above with regard to the solution execution 1205 where the robot exchange is executed for four robots. The second case is also described above with regard to the solution execution 1220 where the robot exchange is executed for eight robots that also incorporate desired controls for a path to follow.

The exemplary embodiments provide a method and device for generating an optimization solution for an optimization problem. Specifically, the optimization solution is a modified version of the ADMM algorithm in which the messages in the message-passing algorithm includes various weights. The weights may indicate a "certainty," a "no opinion," or otherwise a "standard." Through incorporating the weights, the optimization solution may be determined in a more efficient manner. The optimization solution may also be modified through incorporation of knowledge that is determined during the course of the message-passing. Whether a reasoner hierarchy or graph dynamics are used, the knowledge may further improve the efficiency at which the optimization solution is determined.

The exemplary embodiments further provide a method and device in which the optimization solution is determined through solving sub-problems to determine tracklets that generate the optimization solution. Specifically, the tracklets are determined using splines for the convergence process to be performed. Through utilizing the three-weight ADMM algorithm and the further feature of using splines, the optimization solution may be computed quickly and smoothly.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   (a) receiving a trajectory planning problem in which a plurality of agents move from a first configuration to a second configuration, the trajectory planning problem including a plurality of cost functions and a plurality of variables, the cost functions representing possible costs for values of the variables in the trajectory planning problem, each of the cost functions having a predetermined relationship with select ones of the variables, wherein the variables comprise at least one sub-solution to at least one sub-problem associated with the trajectory planning problem, the sub-solution being a spline indicative of a curved path along an estimated trajectory;

(b) generating a first message for each of the cost functions for each corresponding variable based upon the respective predetermined relationship, the first message indicating a first belief that the corresponding variable has a first value when the trajectory planning problem is solved, the first message having a respective first weight indicating a certainty of the first message;

(c) generating a second message for each of the variables for each corresponding cost function based upon the respective predetermined relationship, the second message indicating a second belief that the corresponding variable has a second value when the trajectory planning problem is solved, the second message having a respective second weight indicating a certainty of the second message;

(d) generating a disagreement variable for each corresponding pair of variables and cost functions measuring a disagreement value between the first and second beliefs;

(e) repeating steps (b), (c), and (d) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable;

(f) determining a trajectory planning solution based upon the consensus, wherein the plurality of agents are configured to be moved from the first configuration to the second configuration based upon the trajectory planning solution.

2. The method of claim 1, wherein the trajectory planning problem further includes a predetermined end position.

3. The method of claim 1, wherein the at least one sub-problem is associated with factors considered in the trajectory planning problem.

4. The method of claim 3, wherein the factors comprise a collision avoidance, a soft objective, a continuous first derivative, a line obstacle, a maximum velocity, a maximum velocity, a maximum acceleration, a maximum angular velocity, or a combination thereof.

5. The method of claim 4, wherein select ones of the factors are solved using Sequential Least Squares Quadratic Programming (SLSQP).

6. The method of claim 1, wherein each agent of the plurality of agents has a respective effective radius, the effective radius incorporating a physical dimension of the agent and a predetermined error margin.

7. The method of claim 1, wherein the plurality of agents move based upon one of an automation or a user received instruction, the user received instruction being modified based upon the trajectory planning solution.

8. The method of claim 1, wherein each of the first and second weights is one of a zero weight, an infinite weight, or a standard weight.

9. The method of claim 1, wherein the trajectory planning problem is the plurality of agents moving from the initial position on a circle to an antipodal position on the circle.

10. A device, comprising:
a processor coupled to a memory, wherein the processor is programmed to determine a trajectory planning solution to a trajectory planning problem by:

(a) receiving the trajectory planning problem in which a plurality of agents move from a first configuration to a second configuration, the trajectory planning problem including a plurality of cost functions and a plurality of variables, the cost functions representing possible costs for values of the variables in the trajectory planning problem, each of the cost functions having a predetermined relationship with select ones of the variables, wherein the variables comprise at least one sub-solution to at least one sub-problem associated with the optimization problem, the sub-solution being a spline indicative of a curved path along an estimated trajectory;

(b) generating a first message for each of the cost functions for each corresponding variable based upon the respective predetermined relationship, the first message indicating a first belief that the corresponding variable has a first value when the trajectory planning problem is solved, the first message having a respective first weight indicating a certainty of the first message;

(c) generating a second message for each of the variables for each corresponding cost function based upon the respective predetermined relationship, the second message indicating a second belief that the corresponding variable has a second value when the trajectory planning problem is solved, the second message having a respective second weight indicating a certainty of the second message;

(d) generating a disagreement variable for each corresponding pair of variables and cost functions measuring a disagreement value between the first and second beliefs;

(e) repeating steps (b), (c), and (d) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and (f) determining the trajectory planning solution based upon the consensus, wherein the plurality of agents are configured to be moved from the first configuration to the second configuration based upon the trajectory planning solution.

11. The device of claim 10, wherein the trajectory planning problem further includes a predetermined end position.

12. The device of claim 10, wherein the at least one sub-problem is associated with factors considered in the trajectory planning problem.

13. The device of claim 12, wherein the factors comprise a collision avoidance, a soft objective, a continuous first derivative, a line obstacle, a maximum velocity, a maximum velocity, a maximum acceleration, a maximum angular velocity, or a combination thereof.

14. The device of claim 13, wherein select ones of the factors are solved using Sequential Least Squares Quadratic Programming (SLSQP).

15. The device of claim 10, wherein each agent of the plurality of agents has a respective effective radius, the effective radius incorporating a physical dimension of the agent and a predetermined error margin.

16. The device of claim 10, wherein the plurality of agents move based upon one of an automation or a user received instruction, the user received instruction being modified based upon the trajectory planning solution.

17. The device of claim 10, wherein each of the first and second weights is one of a zero weight, an infinite weight, or a standard weight.

18. A non-transitory computer readable storage medium with an executable program stored thereon, wherein the program instructs a microprocessor to perform operations comprising:
- (a) receiving a trajectory planning problem in which a plurality of agents move from a first configuration to a second configuration, the trajectory planning problem including a plurality of cost functions and a plurality of variables, the cost functions representing possible costs for values of the variables in the trajectory planning problem, each of the cost functions having a predetermined relationship with select ones of the variables, wherein the variables comprise at least one sub-solution to at least one sub-problem associated with the trajectory planning problem, the sub-solution being a spline indicative of a curved path along an estimated trajectory;
- (b) generating a first message for each of the cost functions for each corresponding variable based upon the respective predetermined relationship, the first message indicating a first belief that the corresponding variables has a first value when the trajectory planning problem is solved, the first message having a respective first weight indicating a certainty of the first message;
- (c) generating a second message for each of the variables for each corresponding cost function based upon the respective predetermined relationship, the second message indicating a second belief that the corresponding variable has a second value when the trajectory planning problem is solved, the second message having a respective second weight indicating a certainty of the second message;
- (d) generating a disagreement variable for each corresponding pair of variables and cost functions measuring a disagreement value between the first and second beliefs;
- (e) repeating steps (b), (c), and (d) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and
- (f) determining a trajectory planning solution based upon the consensus, wherein the plurality of agents are configured to be moved from the first configuration to the second configuration based upon the trajectory planning solution.

19. The method of claim 1, wherein the plurality of agents is a plurality of cameras.

20. The method of claim 1, wherein the plurality of agents is a plurality of robots.

* * * * *

UNITED STATES PATENT AND TRADEMARK OFFICE
CERTIFICATE OF CORRECTION

| | | |
|---|---|---|
| PATENT NO. | : 10,572,807 B2 | Page 1 of 1 |
| APPLICATION NO. | : 15/087940 | |
| DATED | : February 25, 2020 | |
| INVENTOR(S) | : Yedidia et al. | |

It is certified that error appears in the above-identified patent and that said Letters Patent is hereby corrected as shown below:

In the Claims

Claim 4, Column 43, Lines 51-52:
"derivative, a line obstacle, a maximum velocity, a maximum velocity, a maximum acceleration, a maximum angular" should read "derivative, a line obstacle, a maximum velocity, a maximum acceleration, a maximum angular"

Claim 13, Column 44, Lines 60-61:
"derivative, a line obstacle, a maximum velocity, a maximum velocity, a maximum acceleration, a maximum angular" should read "derivative, a line obstacle, a maximum velocity, a maximum acceleration, a maximum angular"

Signed and Sealed this
Fifth Day of May, 2020

Andrei Iancu
*Director of the United States Patent and Trademark Office*